March 27, 1956 — G. T. RANDOL — 2,739,679
AUTOMOTIVE FRICTION CLUTCH
Filed May 16, 1950 — 8 Sheets-Sheet 1
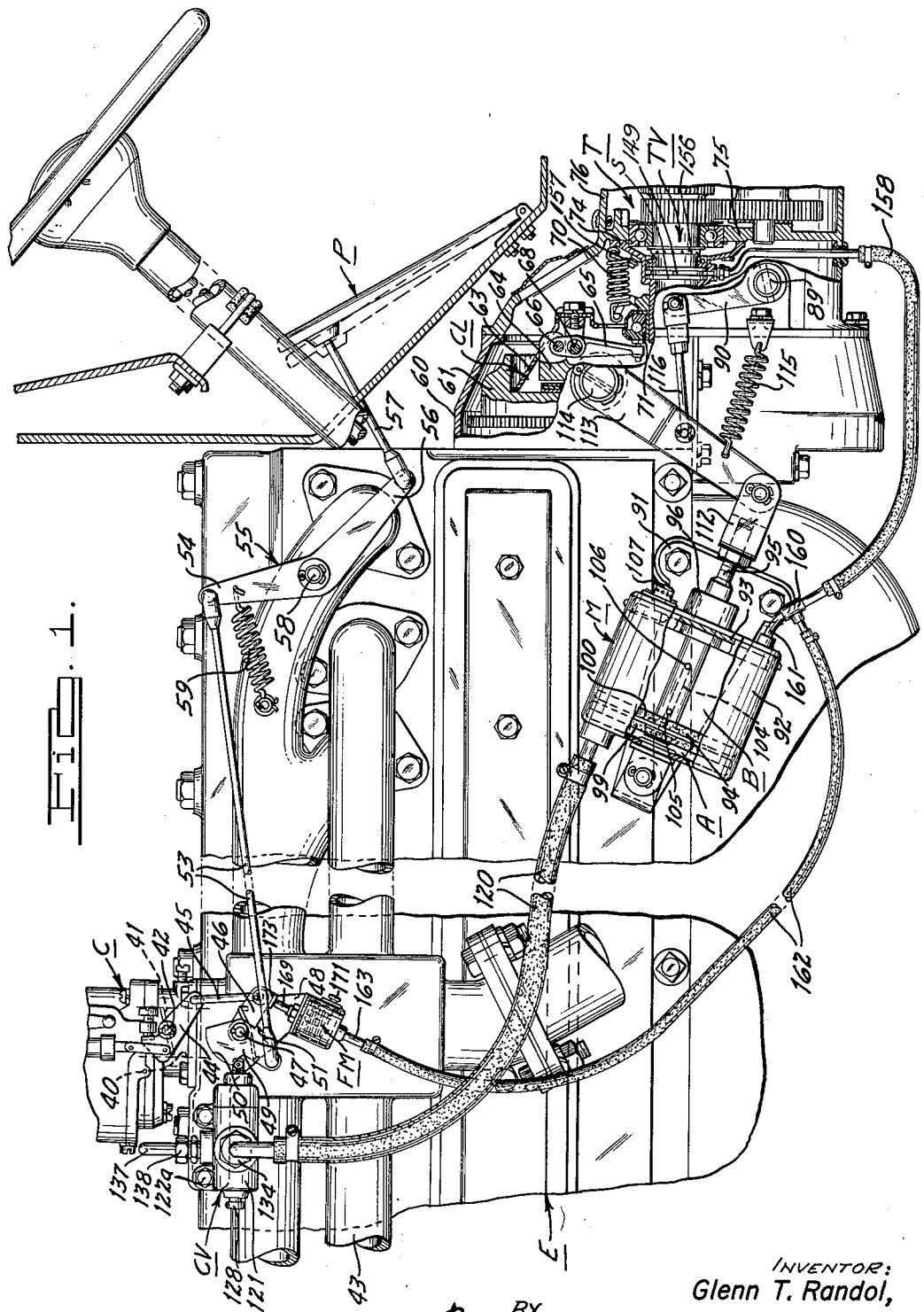
INVENTOR:
Glenn T. Randol,
BY
HIS ATTORNEYS March 27, 1956
G. T. RANDOL
2,739,679
AUTOMOTIVE FRICTION CLUTCH
Filed May 16, 1950
8 Sheets-Sheet 2
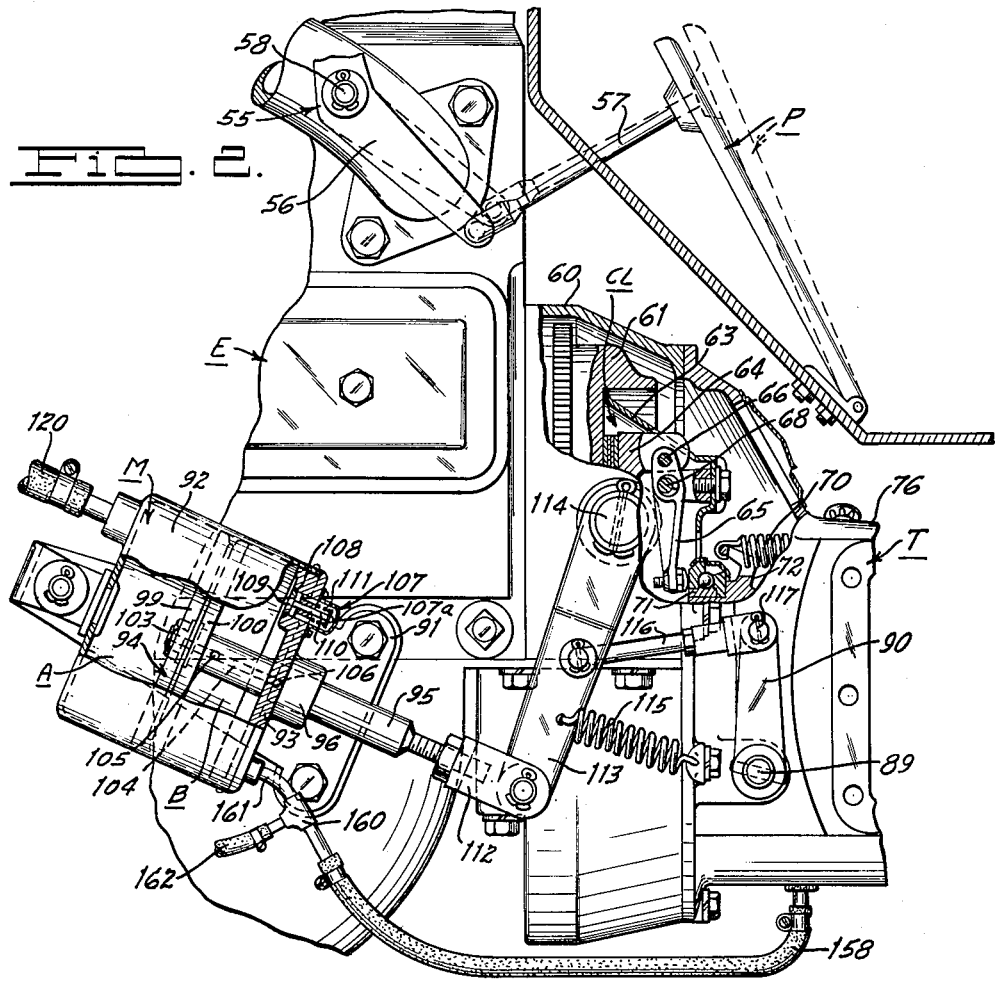
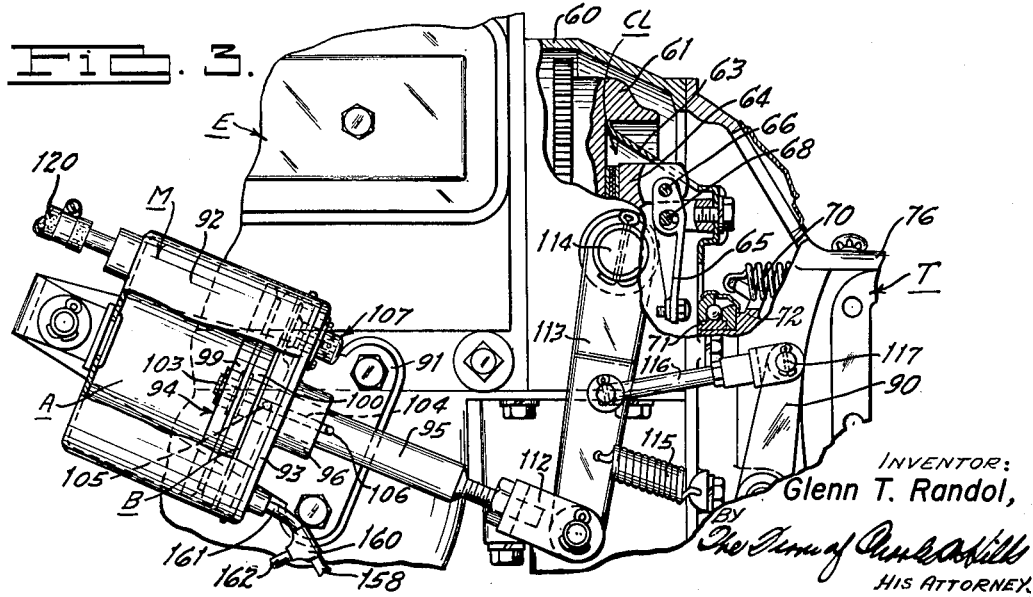
INVENTOR:
Glenn T. Randol,
HIS ATTORNEY

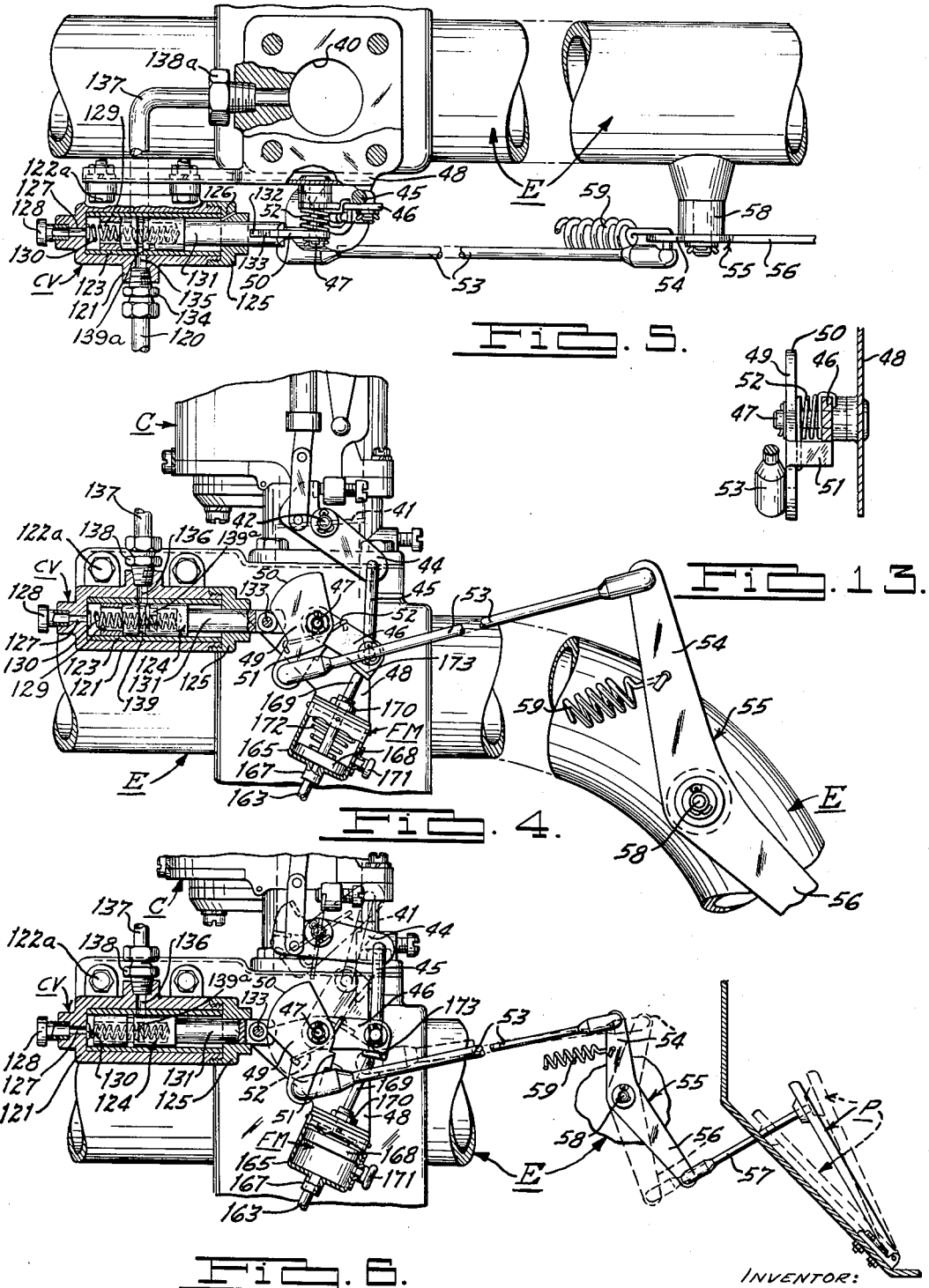

March 27, 1956  G. T. RANDOL  2,739,679
AUTOMOTIVE FRICTION CLUTCH
Filed May 16, 1950  8 Sheets-Sheet 4
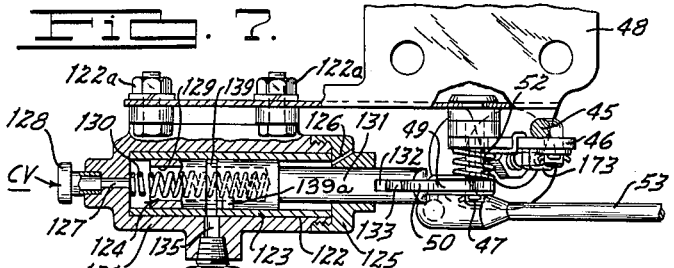
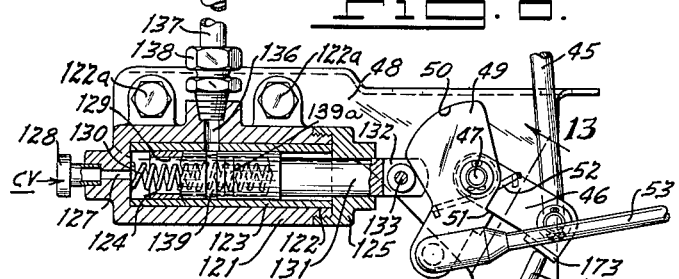
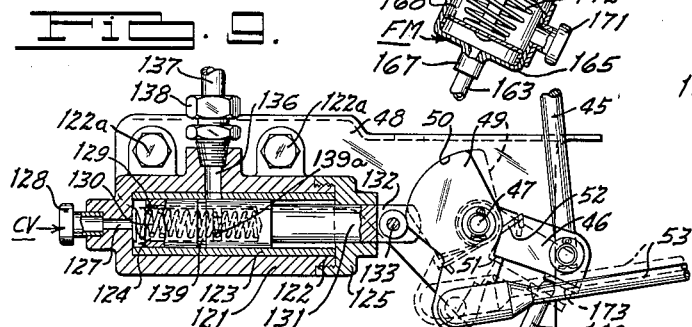
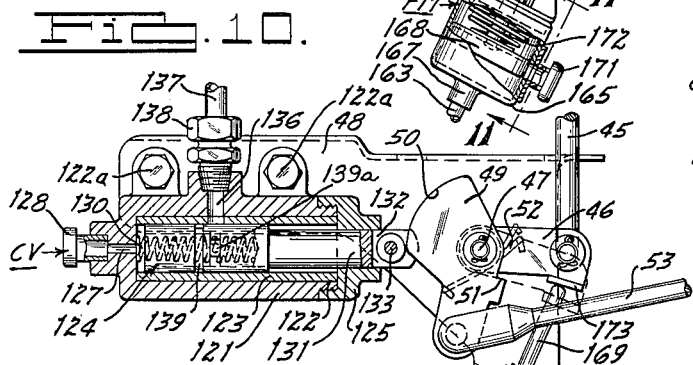
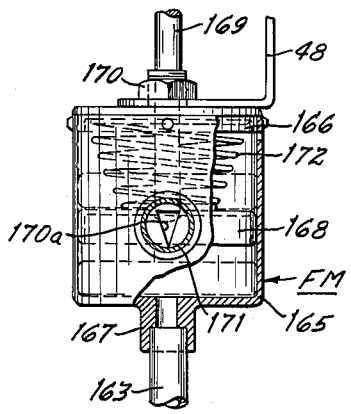
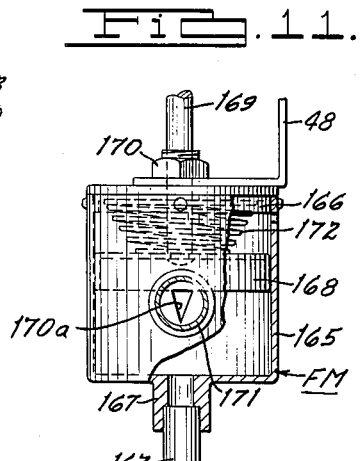
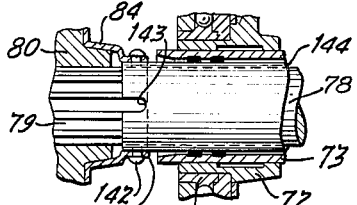
INVENTOR:
Glenn T. Randol,
BY
HIS ATTORNEYS March 27, 1956 G. T. RANDOL 2,739,679
AUTOMOTIVE FRICTION CLUTCH
Filed May 16, 1950 8 Sheets-Sheet 5
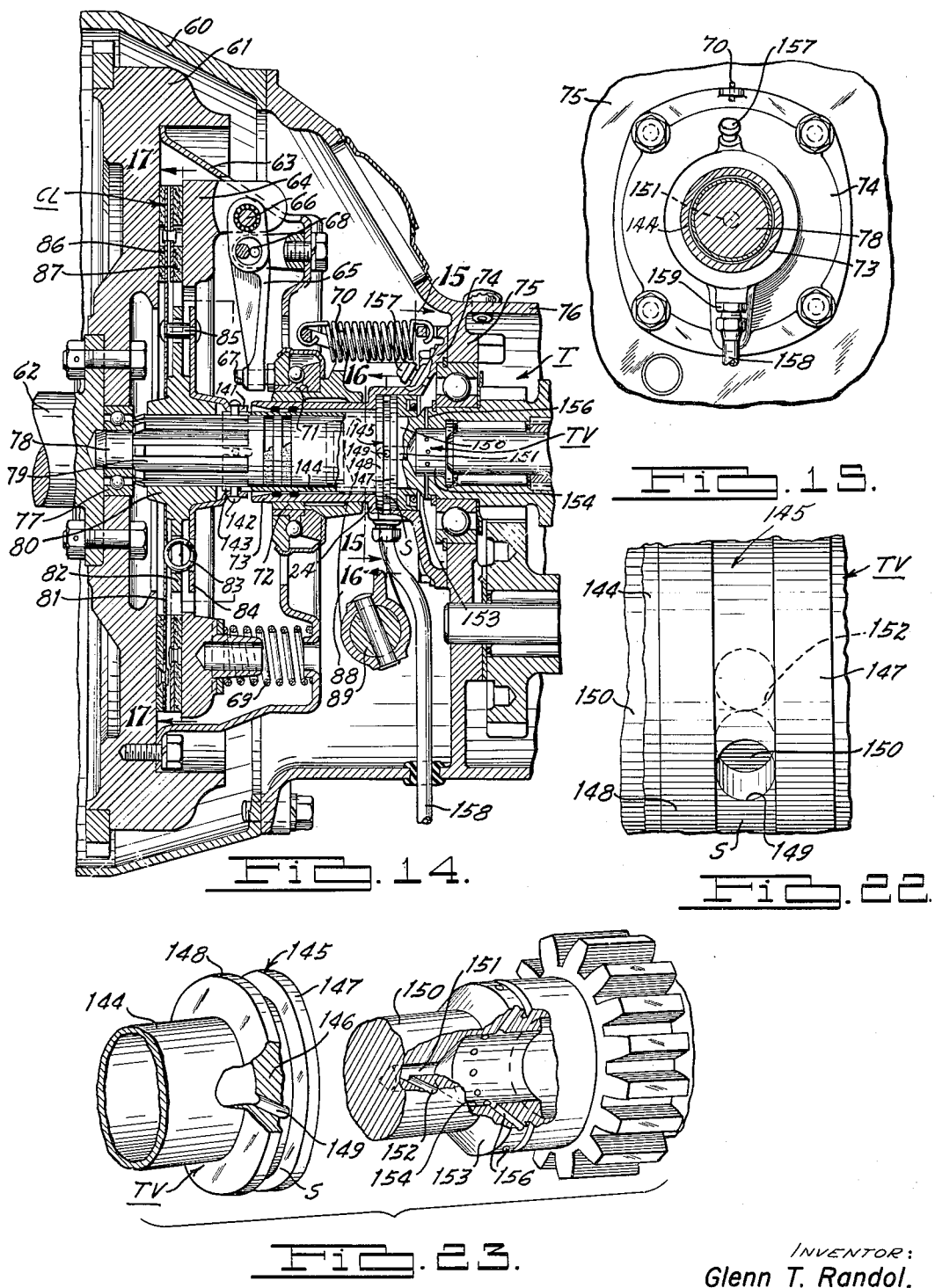
INVENTOR:
Glenn T. Randol,
HIS ATTORNEYS.

March 27, 1956  G. T. RANDOL  2,739,679
AUTOMOTIVE FRICTION CLUTCH
Filed May 16, 1950  8 Sheets-Sheet 6

INVENTOR:
Glenn T. Randol,
BY The Firm of Charles K. Hill
HIS ATTORNEYS.

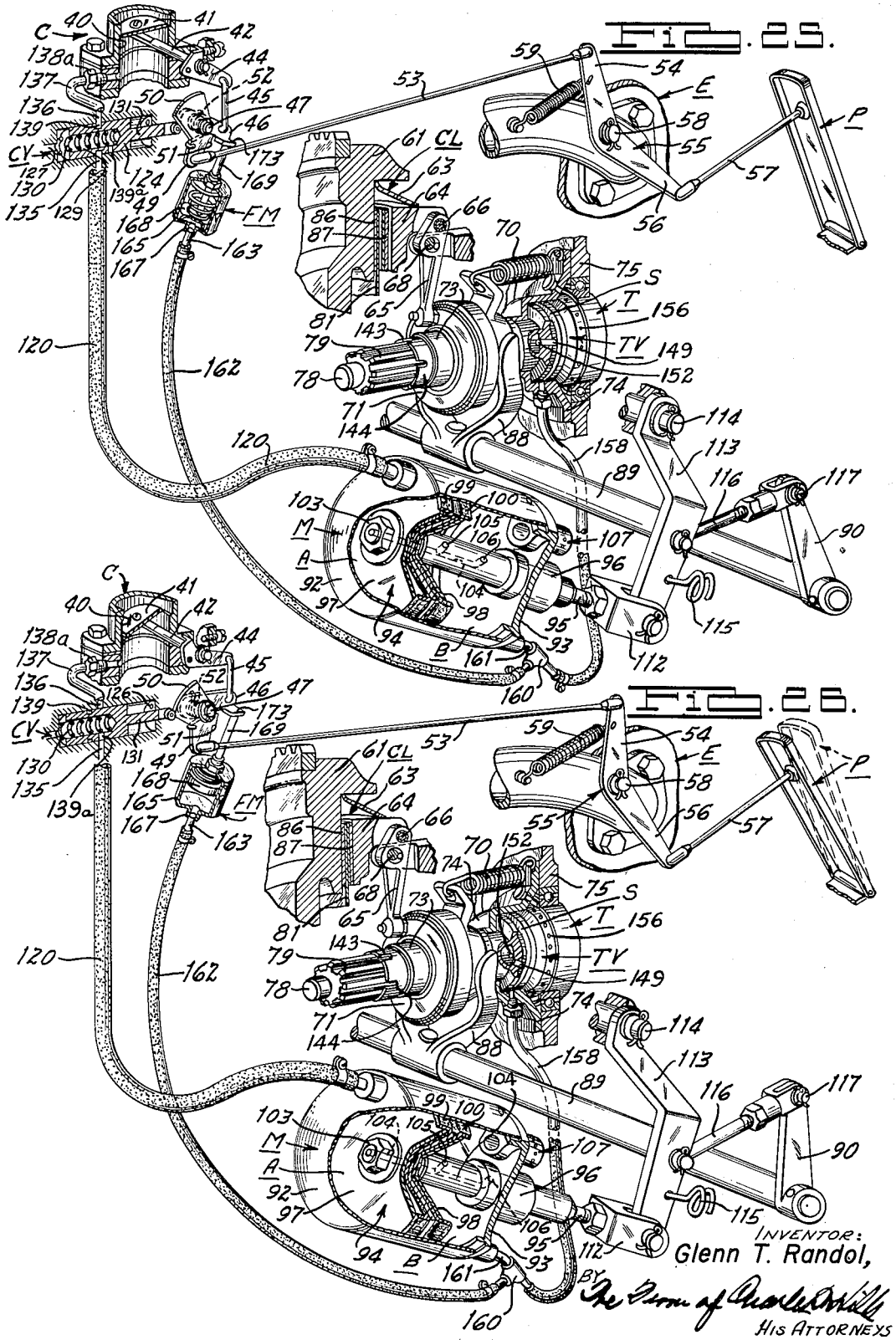

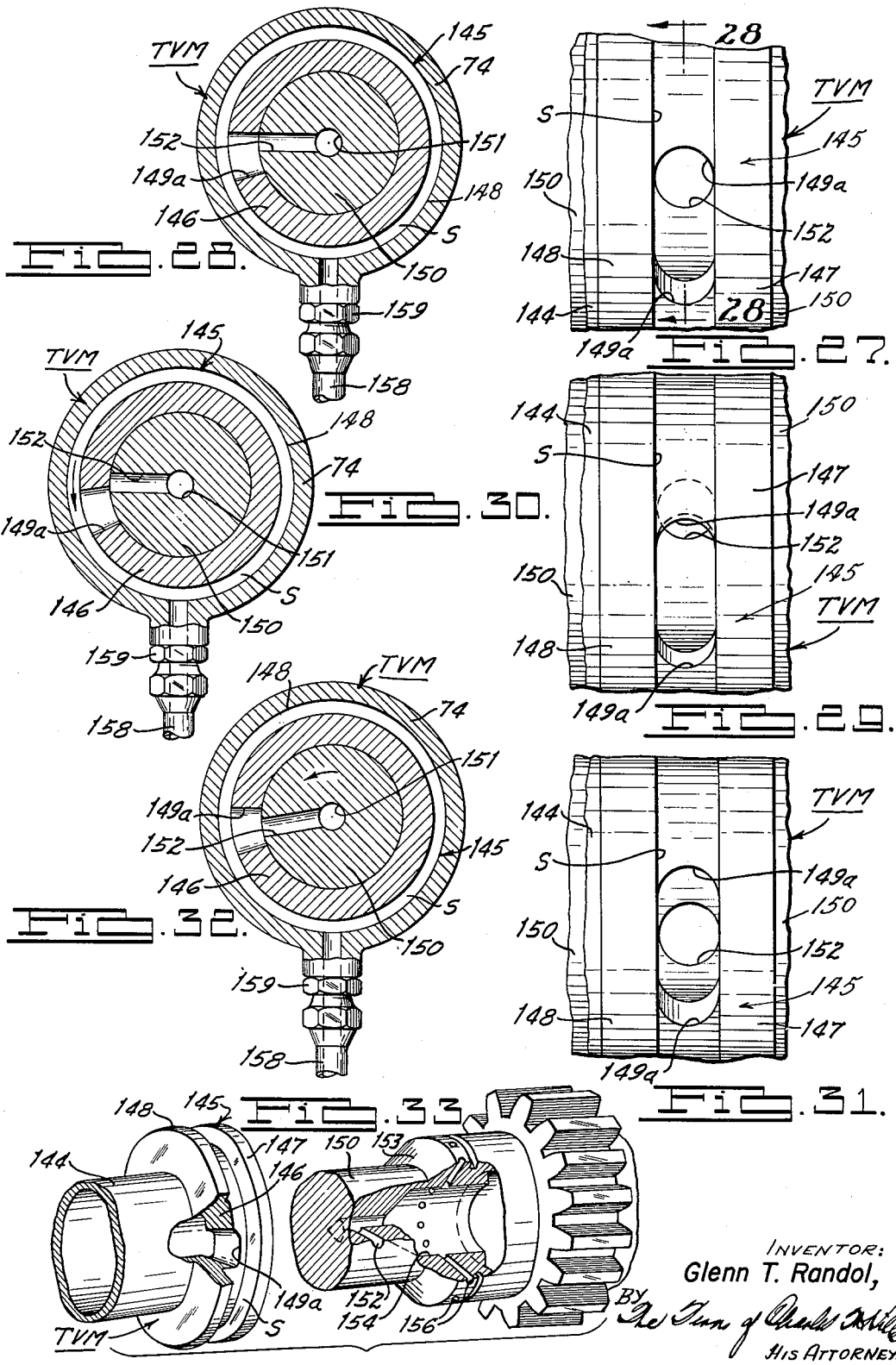

United States Patent Office 2,739,679
Patented Mar. 27, 1956

2,739,679

AUTOMOTIVE FRICTION CLUTCH

Glenn T. Randol, Mountain Lake Park, Md.

Application May 16, 1950, Serial No. 162,228

50 Claims. (Cl. 192—.075)

This invention relates to power-actuated clutches for automobiles and the like, and more particularly to new and useful improvements in the control system and mechanism therefor of the character disclosed in my co-pending U. S. application filed July 18, 1946, under Serial No. 684,465, issued January 6, 1953, as Patent No. 2,624,432.

Among the important objects of the invention is to provide novel and improved control means for a power-actuated clutch which will enable an operator to properly and efficiently control the disengagement of the clutch and its re-engagement without any particular manipulation of the control means actuated by the operator.

Another object is to provide means controlled by the torque initially transmitted by a power-actuated clutch for regulating a first stage engaging action thereof so as to produce a smooth flow of power therethrough irrespective of variations in the load.

Still another object is to provide means for controlling the extent of initial engaging action of the elements of a power-actuated clutch by means responsive to the torque transmitted by the elements after initial engagement thereof.

A further and important object of the invention is to adapt a conventional friction clutch mechanism for engagement by torque-responsive control means actuated directly by the driven member thereof, and wherein the driven member comprises two sections interconnected by a series of cooperable yieldable torque-transmitting means and lost-motion connections which normally define limited relative angular movement between said sections, and are adapted to accommodate the following dual functions; namely, (1) damping torsional vibration, and (2) actuating the torque-responsive means to control re-engagement of the clutch driving and driven members.

An object related to that last stated is to so modify the damping or cushioning springs and their cooperating lost-motion connections of a conventional friction clutch whereby sufficient relative angular displacement between the two driven member sections is effective to directly actuate the torque-responsive control means upon initial contact of the clutch frictional members.

A further important object is to embody in a power clutch controlling mechanism, means responsive to torque transmitted by the clutch elements during initial slipping engagement; and rendered effective by the operation of the accelerator mechanism of an engine with which the clutch is associated, for controlling the final engaging movements of the clutch elements after initial contact.

Another important feature of the present invention is the provision of means for accomplishing the engaging of the elements of a clutch under the control of means responsive to the torque transmitted by the elements following a mere initial engagement thereof and wherein, during such engaging movements of the clutch elements, engine throttle regulating means may be automatically operated to increase the acceleration of the engine substantially in direct proportion to the torque load being transmitted through the elements of the clutch to prevent stalling of the engine in the event that the operator would only move the throttle valve to a position slightly beyond idling position.

Thus, another important feature is realized in the provision of automatic means for increasing the acceleration of the engine as torque requirements increase in starting the vehicle, with the automatic restoration of the throttle to operator-established position as soon as the engine has taken up the load of getting the car in motion, and the torque-control being rendered ineffective to prevent the interruption of acceleration, except during shifting after the vehicle is in motion.

Therefore, the acceleration of the engine is substantially proportional to the torque-transmitting capacity of the clutch. This ideal correlation of engine operational speed and torque-load imposed thereon is maintained until the vehicle is in actual motion.

Yet another object is to provide improved control means for a power-actuated friction clutch associated with a prime mover having an accelerator mechanism which will cause the elements of a clutch to assume initial contact by initial actuation of said accelerator mechanism from released engine idling position, and thereafter controlled to final engagement condition by the torque being transmitted by the clutch elements after initial engagement together with the continued actuation of the accelerator mechanism.

An object related to the object immediately preceding is the inclusion in the control means of novel mechanism responsive to such continued actuation of the accelerator mechanism, for either overruling or cooperating with said torque-responsive control to enable full clutch engagement despite aforesaid operation of the torque-responsive control to establish the clutch frictional elements in arrested or retarded slipping relative engagement, respectively.

A further object is to provide improved control means for a power-actuated friction clutch associated with a prime mover having an accelerator mechanism which will control the elements of the clutch to assume initial contact by initial actuating of the accelerator mechanism from its fully released engine idling position, and wherein the final engaging movements of the clutch elements will be controlled by the torque being transmitted by the clutch elements after initial engagement in direct proportion to increased throttle opening also controlled by the torque transmitted as stated above.

A further important object of the present invention is the provision of novel valve means for controlling the engaging action of a fluid-pressure operated automotive clutch, responsive to a predetermined operation of the engine accelerator mechanism to inaugurate direct torque-control of said valve means for establishing the clutch in partially engaged condition, said valve means being further responsive to additional operation of the accelerator mechanism in an engine accelerating direction for causing the valve means to overrule the torque-control aforesaid to enable operation of the clutch into fully engaged condition automatically.

A further object is to provide in a control means for controlling engagement of a clutch, means responsive to torque transmitted by the elements of the clutch following initial engagement for arresting or retarding the engaging action of the clutch elements to full engagement as the vehicle is being put in motion, with the torque-responsive means being rendered ineffective to prevent substantial acceleration interruption after the vehicle is in motion.

Yet a further object is to associate with the arresting or retarding means of the clutch control means an automatically operated means for accelerating the engine to maintain the torque in balance with the load to be moved, said automatic means also being controlled by the torque transmitted through the clutch elements following initial contact thereof.

A further object is to provide a clutch engaging control means for a clutch associated with a prime mover which will insure that the torque of the prime mover will be maintained at such a value with respect to the load that stalling of the prime mover will be prevented under all operating conditions of the vehicle.

Another object is to so combine a power-actuated clutch control structure with a torque responsive device so associated with the clutch, that it will properly function indefinitely without necessity of any adjustment throughout the life of the clutch frictional facings in its disengaging and re-engaging operations, so that a vehicle can be driven efficiently with a minimum of effort and caution on the part of the operator and without likelihood of stalling the engine due to lack of torque output in relation to throttle opening position for the load to be moved.

Still another important and desirable feature of the present invention resides in an improved control mechanism for a clutch-actuating power-operated device having a movable element, which has embodied therein an improved valving mechanism so controllable by predetermined movements of the movable element toward clutch engaging position as predetermined by torque transmitted through the clutch elements during initial re-engagement, whereby said valving will translate the torque condition to modify differential fluid pressure for actuating a throttle controlling power cylinder in such manner that, if the operator has not increased the speeding up of the engine in proportion to the torque required to move the load, the throttle opening power cylinder will automatically take over the opening of the throttle to such a degree as necessary to maintain the engine speed in substantially direct proportion to the torque load required. Thus stalling of the engine is prevented notwithstanding the fact that the operator has only moved the throttle to a predetermined open position. Following the operation of the automatic means for opening the throttle with the car underway, the throttle opening device will be instantly disabled which will release the carburetor throttle valve for return movement to the position previously established by the operator through the depressing of the accelerator pedal. If, however, the operator has continued to depress the accelerator pedal during the automatic opening of the throttle as above described, the operator will therefore pick up the throttle valve at such point when power throttle opening device is disabled and continue operation of the vehicle in a normal manner, since the piston of the throttle opening motor has been released for return movement to its normally inoperative position as a result of the clutch elements being fully engaged. When the clutch elements are fully engaged, the valving ports carried by the piston rod of the clutch disengaging motor provide for the bleeding of air from the rear chamber of this motor, as well as from the lower chamber of the throttle opening motor, which places the throttle opening motor piston in its extreme lower position thus enabling the operator to actuate the carburetor throttle valve through its full engine-operating-range of movement in the same manner as would be done if such a device were not incorporated.

Therefore, a further important object is to associate with a control valve mechanism directly actuated by the torque being transmitted through the clutch elements after initial engagement thereof, a power device through which such torque conditions in the clutch mechanism may be effective to regulate the initial engaging movements of said clutch elements.

A further object is to associate with a control means adapted for controlling a fluid-pressure motor during the engaging movements of the clutch elements, an engine accelerator mechanism effective during depression thereof to complete the final engaging movements of the clutch elements to full torque-transmitting efficiency only after a predetermined torque has been transmitted by the clutch as a result of initial engagement of its elements.

A further object is to associate with a control means employed to control a fluid pressure-differential operated motor during clutch engagement, an automatic accelerator mechanism effective to complete the final engaging movements of the clutch elements to fully engaged condition after a predetermined torque has been transmitted by the clutch following initial engagement of its elements, notwithstanding initial movement of the accelerator mechanism to a predetermined throttle opening position short of that position necessary to prevent stalling of the engine due to the load required to be moved.

A further object is to associate with a control means employed to control a fluid pressure motor during clutch engagement, an accelerator mechanism operative in such manner that both automatic and manual means may be combined to simultaneously actuate the opening of the throttle to complete the final engaging movements of the clutch elements to fully engaged condition after a predetermined torque is transmitted by the clutch following initial engagement of its elements and wherein the automatic means for actuating the accelerator mechanism is controlled by the predetermined torque as aforesaid.

A further object is to produce a power-actuated clutch control mechanism which will embody slipping control of a vehicle clutch solely by torque-responsive means following the initial opening of the carburetor throttle valve.

A further object is to produce a clutch control mechanism providing the correlated control of a motor vehicle clutch by the use of an accelerator mechanism and a torque-responsive device so associated in their functioning that the initial depressing of the accelerator pedal will initiate rapid engaging movements of the clutch elements to the initial point of contact wherein engine torque is then transmitted at a predetermined value to the driven member of the clutch, which condition automatically causes the torque-responsive means to be effective to arrest further engaging movements of the clutch elements without first bringing the engine speed up in proportion to the load to be moved, notwithstanding that the accelerator mechanism is held in its initially established open position.

A still further object is to produce a clutch control mechanism providing the correlated control of the vehicle clutch by the use of an accelerator mechanism and a torque-responsive device so associated in their functioning that the initial depressing of the accelerator pedal will initiate rapid engaging movements of the clutch elements to the point of initial contact wherein the engine torque is then transmitted at a predetermined value to the driven member of the clutch, which condition automatically causes the torque-responsive means to be effective to arrest further engagement of the clutch elements or to retard the rate of engagement so that stalling of the engine will be prevented in the event the throttle opening and speed of the engine are insufficient to overcome the load imposed thereon in starting the vehicle.

A further object is to produce a clutch control mechanism which will embody means responsive to the torque transmitted during the engaging action of the clutch so as to obtain a smooth clutch engagement without any special operation of an accelerator mechanism employed to initiate clutch disengagement and control re-engagement by means of the control mechanism, and wherein adjustments to compensate for wear of the various operating parts are entirely eliminated.

A more specific object is to embody in a clutch control means employing a fluid pressure motor, a simple and inexpensive valve means controllable by the engine accelerator mechanism and a torque-responsive means, and which will require no adjustments to compensate for wear, heat and other factors which operate to change the initial point at which the clutch elements engage.

Yet another object is to produce a clutch control mechanism for a motor vehicle which will produce quick clutch disengagement upon the full release of the accelerator mechanism of the engine with which the clutch is associated, and wherein initial depressing of the accelerator mechanism will initiate rapid movement of the clutch elements toward initial contact position which, after assuming a condition to transmit a predetermined amount of torque therethrough, will accommodate a desirable relationship to be established between continued clutch engaging movements and the engine speed to produce a smooth clutch engagement under all operating conditions of the vehicle.

The clutch is thus regulated into engagement under torque-modulated pressure, the pressure being modulated according to the torque condition or transmitting capacity of the clutch elements.

Still another object of the invention is to provide a fluid pressure operated device for disengaging and controlling re-engagement of a vehicle friction clutch, and the controlling function of said device being correlated with the torque conditions in the clutch mechanism during re-engagement thereof, irrespective of the position of the vehicle engine accelerator mechanism following its initial depressing movement from full released position.

Other and further important objects of this invention will be apparent from the disclosures in the specification and the accompanying drawings.

In the drawings:

Figure 1 is a side view of a portion of a power plant, such as the internal combustion engine of a motor vehicle, showing my improved clutch control mechanism associated therewith, the illustrated clutch being fully disengaged and the accelerator mechanism of the power plant in idling speed (fully released) position;

Figure 2 is an enlarged view of a portion of the structure of Figure 1 showing the accelerator mechanism in a slightly depressed position and the clutch controlling fluid motor in a condition wherein the clutch elements are at their initial engaging relation;

Figure 3 is a view similar to Figure 2 but showing the clutch friction elements in their fully engaged relation;

Figure 4 is a side view of the clutch controlling valve mechanism and related control parts which are carried by a bracket supported on the inlet-manifold of the engine, said valve and control parts being actuated by the accelerator pedal;

Figure 5 is a plan view of the structure shown in Figure 4;

Figure 6 is a side view similar to Figure 4 but showing the accelerator pedal slightly depressed for causing the carburetor butterfly valve to open for accelerating the engine and conditioning the clutch controlling fluid motor as shown in Figure 2;

Figure 7 is an enlarged view of a portion of the structure shown in Figure 5;

Figure 8 is an enlarged view of a portion of the structure shown in Figure 4;

Figure 9 is an enlarged view of a portion of the structure shown in Figure 6;

Figure 10 is a view similar to Figures 6 and 9 but showing the accelerator pedal in arrested condition following slight depression of same and the throttle opening fluid motor piston moved to its extreme upward position to provide additional acceleration of the engine in accordance with the increased torque required to move the load imposed on the engine in starting the vehicle.

Figure 11 is an enlarged view taken on the line 11—11 of Figure 9;

Figure 12 is a view similar to Figure 11 but showing the piston of the motor moved to extreme operative position as shown in Figure 10;

Figure 13 is a view of the lever and torsional spring assembly taken on the line 13—13 of Figure 8 and showing in particular the lateral extending lug for causing the two levers to move in unison under certain operative conditions;

Figure 14 is a longitudinal sectional view taken through the central portion of the engine flywheel, clutch carried thereby, clutch releasing mechanism and a portion of the associated transmission gearing, the view being taken substantially through the center of the engine crankshaft and main shaft of the transmission;

Figure 15 is a view taken on the line 15—15 of Figure 14;

Figure 22 is an enlarged view of the torque-actuated valving passages;

Figure 23 is an exploded view in perspective of the torque-actuated valve elements showing in detail the various ports;

Figure 17:
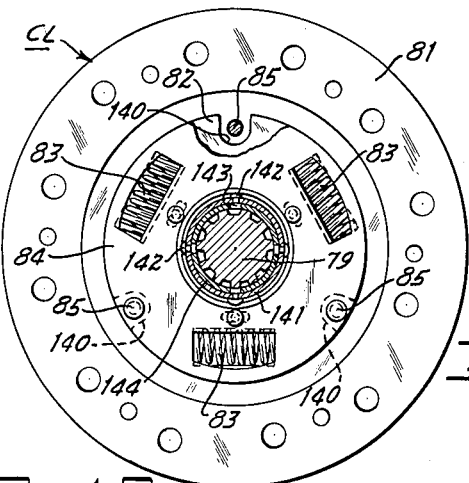
Figure 17 is a view of the clutch frictional disc taken on the line 17—17 of Figure 14.

Figure 24 is a fragmentary longitudinal sectional view of the connection between the non-splined disc of the clutch frictional disc assembly and one of the elements of the torque-actuated valve. This view shows in particular four slots for accommodating limited relative sliding action between the disc member and the valve member which prevents the disc from transmitting to the valve member any forces other than a floating turning force;

Figure 25 is a schematic perspective view of the components comprising my improved torque controlled clutch means, said parts being shown in fully clutch disengaged position and the engine operating in closed throttle idling condition;

Figure 26 is a schematic perspective view similar to Figure 25 but showing the position of the various components and the parts comprising them in operated positions wherein the accelerator has been slightly opened to accelerate the engine to interrupt energization of the fluid motor, which operates the clutch to release the clutch, elements to the point of initial contact influenced by spring-engaging action following which a predetermined value of torque has been transmitted through the clutch elements to the torque-actuated valve and thereby caused the fluid motor to arrest further spring-engaging movements of the elements except as accommodated by the further bleeding off of the trapped air in the rear chamber of said fluid motor through the throttle opening motor, which in turn additionally opens the throttle beyond the position established by the slight depressing of the accelerator pedal, and thus causing the final engaging movements of the clutch elements to be completed by spring-engaging action in accordance with increased torque from the engine, whereupon the vehicle is caused to be driven without the likelihood of stalling the engine;

Figure 27 is an enlarged view of a slightly modified form of the torque-actuated valve, such that the rate of movement of the clutch elements toward fully engaged relation are only retarded to provide a blending of the correlated torque response control with the accelerator movement and the increasing of the throttle opening as a result of increased load imposed on the engine which may be not detected by the operator in time to prevent a stalling of the engine;

Figure 28 is a cross-sectional view taken on the line 28—28 of Figure 27 and showing details of the valve passages;

Figure 29 is a view similar to Figure 27 but showing the position of the valve passages at the point of initial clutch contact and the engine is attempting to drive the vehicle;

Figure 30 is a cross-sectional view similar to Figure 28 but showing the position of the valve passages corresponding to the conditions shown in Figure 29;

Figure 31 is a view similar to Figures 27 and 29 but showing the position of the valve passages when the vehicle is driving the engine. In other words, "coasting drive" wherein the engine is operating at idling speed and the speed of the vehicle exceeds the speed of the engine;

Figure 32 is a cross-sectional view similar to Figures 28 and 30 but showing the position of the valve passages corresponding to the conditions shown in Figure 31; and Figure 33 is an exploded perspective view of the modified torque-actuated valve elements as detailed in Figures 27 to 32, inclusive.

Referring to the drawings:

TORQUE PRODUCING AND TRANSMITTING MECHANISM

Referring to the drawings and particularly to Figure 1 thereof, there is disclosed a portion of an automotive vehicle, primarily the power plant thereof, having associated therewith clutch controlling mechanism embodying my invention. The power plant is illustrated as an internal-combustion engine "E" and has associated therewith a conventional change-speed transmission "T," partially shown, through which the wheels of the vehicle may be driven at various gear ratios, as is well known in the art. The engine "E" is arranged to have its speed varied at will by means of a carburetor "C" and the usual accelerating mechanism, including a pedal "P" mounted in the operator's compartment of the vehicle.

The carburetor C defines an interior venturi air-fuel mixing chamber 40 controlled by a conventional butterfly throttle valve 41 mounted therein on a pivot shaft 42, the butterfly valve 41 controlling communication between the passage 40 and the engine intake-manifold 43. A pivot lever 44 is provided for actuating a butterfly valve 41 and is linked through a rod 45 to a lever arm 46. The arm 46 is pivoted about a pin 47 secured to a dependent arm of a bracket 48 carried by the carburetor.

A cam lever 49 having an upper arcuate camming surface 50 is likewise pivoted on the pin 47. The cam lever 49 is provided with a lower lateral flange 51 underlying the arm 46 for normally effecting concurrent movement of the arm 46 with the lever 49 when the latter is moved responsive to operating the accelerator mechanism P. A preloaded torsional spring 52 is interposed between the arm 46 and the lever 49, the spring 52 serving to resist separation of the lever and arm by yieldably maintaining the lever shoulder 51 against the undersurface of the lever arm 46 whereby said lever and arm are rotated in unison. The ends of the torsional spring 52 are anchored to the arms 46 and 49, and it will be seen that these two members are capable of limited relative yieldable separation against the action of the spring 52 or they are releasably locked together to turn in unison by the cooperative action of lever flange 51 and said spring responsive to the mode of operating the accelerator mechanism P. The purpose of this construction will be described hereinafter in greater detail.

The cam lever 49 is linked to the pedal P by means of an actuating rod 53 extending rearwardly thereof and pivoted to one arm 54 of a pivoted double arm 55 which has its lower arm 56 pivoted directly to the pedal actuating arm 57. The pivoted double arm 55 is pivoted intermediate its length, as about pin 58, to any suitable point on the side of the engine E. The rod 53 is urged forward to rotate the cam lever 49 in a clockwise direction by means of a coil spring 59 secured to the arm 54 and to the engine.

It will be seen that the spring 59 urges the pedal P to its full line, released position as illustrated in Figure 1, and that depression of the pedal P, as in dotted outline, will serve to rotate the cam lever 49 in a counterclockwise direction against the action of the spring 59.

As best shown in Figures 1, 2, 3, 14, 17, 19, and 21, the vehicle is provided with an engine driven clutch "CL" of the friction type interposed between the engine E and the transmission T. The clutch CL is enclosed by housing 60 which also encloses a flywheel 61 secured to the rear end of the engine crankshaft 62, the rear end of the flywheel 61 carrying a backing plate 63 upon which is mounted a clutch pressure plate 64 for relative axial movement toward and away from the flywheel. The pressure plate 64 is actuatable by the usual clutch releasing levers 65 (three in number) which are pivoted to the pressure plate 64, as at 66, and to the backing plate 63, as at 68.

Between the backing plate 63 and the pressure plate 64 are interposed a plurality of clutch engaging springs 69 (nine in number) serving to urge the pressure plate toward the flywheel 61 against the action of bearing springs 70 acting on a clutch throw-out bearing 71 to free the bearing from the levers 65 when the clutch is engaged. The bearing 71 is mounted for axial sliding movement on a sleeve 72 slidable on a tubular end portion 73 of a housing 74 secured to the forward end wall 75 of a transmission housing 76 enclosing the transmission T.

The flywheel 61 carries centrally thereof a bearing 77 which pilots the forward end of the clutch driven or pilot shaft 78. The clutch shaft 78 is provided with a splined portion 79 adjacent the pilot portion thereof, the splined portion 79 receiving thereon a hub 80 for floating axial movement. This hub 80 carries thereon a clutch disk 81 secured thereto by means of a flange 82 on the hub 80 and coil-type radially spaced cushioning-torque springs 83 (three in number) extending through the hub flange and the clutch disk. The disk 81 is positioned on one side of the flange 82 and a balance ring 84 is positioned on the other side thereof. The cushioning springs more particularly are carried by the flange 82 in corresponding slots therein and registering slots are provided in the balance ring 84 and the clutch disk 81. The clutch disk 81 and the balance ring 84 are further secured together by means of rivets 85 extending therethrough and through oversized registering slots in the flange 82, as will hereinafter be described in greater detail.

Opposing outer peripheral faces of the clutch disk 81 are provided with clutch friction facings 86 and 87, respectively, these facings serving to clamp the disk to the flywheel by the action of the pressure plate 64 under the biasing effect of the clutch-engaging springs 69 so that the clutch disk 81 serves to couple the shafts 62 and 78.

The forward cylindrical portion 73 of the housing 74 surrounds the clutch shaft 78 rearwardly of the splined portion 79 and the clutch throw-out bearing 71, slidable thereon through the sleeve 72, is adapted to be actuated by a throw-out yoke or fork 88 carried by a clutch throw-out shaft 89 journaled in the clutch housing. The shaft 89 carries an actuating arm 90 exteriorly of the housing (Figure 1) for disengagement of the clutch by moving the pressure plate 64 rearwardly within the housing against the action of the springs 69.

CLUTCH ACTUATING SERVOMECHANISM

In the particular embodiment of the invention illustrated in the drawings, a clutch-actuator such as, for example, a fluid servomotor of the suction type is employed for disengaging the clutch and for controlling its re-engagement. In operating the clutch, differential air pressures are employed, more particularly the differential pressure between atmospheric pressure and the intake-manifold pressure of the engine.

In the drawings, the servomotor clutch-actuator is indicated generally by the letter "M" and is pivotally secured to the side of the engine adjacent the clutch by means of a bracket 91. As best shown in the drawings in Figure 2, the motor M comprises a cylindrical open-ended exterior casing 92 having its one open end closed by an end closure plate 93 and enclosing therein for axial reciprocation a piston 94 mounted on an actuating rod 95 guided through the end plate 93 by means of an internally bored outwardly extending embossment 96. The piston 94 is built up of a pair of dished piston plates 97 and 98 bottomed against an integral shoulder on the actuating rod 95 and having peripherally extending oppositely directed bearing shoulders 99 and 100, respectively, bearing against the inner periphery of the casing 92 in sealing engagement therewith. The piston assembly is retained on the actuating rod 95 by means of a nut 103 threaded thereon.

That end of the actuating rod 95 to which the piston is secured is axially bored, as at 104, and a pair of axially spaced radial bores 105 and 106 communicate with the interior bore 104 on one side of the piston 94. It will be seen that the axial bore 104, together with the spaced radial bores 105 and 106, places the differential air chambers "A" and "B" defined in the casing 92 by the piston 94 in communication. The motor cover plate 93 carries a check valve 107 (Figure 2) which comprises an internal frusto-conical seat 108 defined in the end plate 93 and closed by a correspondingly shaped valve member 109 having a shaft pin 110 resiliently biased by a spring 111 to valve closed position. An apertured valve cap 112 surrounds the exposed end of pin 110 and the spring 111. It will be seen that when pressure in the motor chamber B drops below atmospheric pressure, the differential atmospheric pressure will force the valve 109 open against the action of the spring 111 to vent the chamber B to the atmosphere. The differential pressure required for the opening of the valve element 109 is determined by the biasing strength of the spring 111.

The actuating rod 94 of the motor M is secured to a clevis joint 112 pivoted to an arm 113 which in turn is pivoted, as at 114, to the side of the clutch housing 60. The arm 113, intermediate its length, is pivoted to a connecting link 116 pivotally attached to the clutch throw-out shaft actuating arm 90. A tension spring 115 is secured to the transmission housing and the arm 113 to urge the arm toward the housing, the piston 94 toward the end plate 93, and the throw-out bearing 71 to clutch engaged position. It will thus be seen that movement of the actuating rod 95 of the motor M against the spring 115 will cause corresponding rotative movement of the clutch throw-out shaft 89 and of the clutch throw-out bearing 71 operatively connected thereto, thereby actuating the clutch pressure plate to disengaged position.

Chamber A of the motor M, hereinbefore described, is adapted to be vented to the pressure of the manifold 43 of the engine E through a fluid conduit 120 communicating through the casing 92 with the interior thereof. The conduit 120 terminates at a control valve "CV," (Figures 4–10, inclusive) which includes an outer casing 121 secured to the bracket 48 by suitable means, as by screws 122. The casing 121 of the control valve CV is provided with an interior recess 122 having one open end and a cylindrical bearing liner 123 journaling therein for reciprocatory movement a valve element 124. The open end of the recess 122 is closed by an axially bored threaded cap 125 venting the interior of the bore 122 to the atmosphere through a venting orifice 126. That end of the valve body 121 opposite the cap 125 is likewise vented to atmosphere through a reduced vent bore 127 and a nipple cap 128.

The valving element 124 is internally recessed as at 129 and a compression spring 130 is confined between the valve body 121 and the end wall of the valve element recess 129 to urge the valving element 124 toward the end cap 125. The valving element 124 is provided with an actuating rod 131 rigidly secured thereto or formed integrally therewith and extending through the bore of the end cap 125 exteriorly of the valve body 121. The free end of the actuating rod 131 is slotted as at 132 to receive the cam lever 49 hereinbefore referred to and pivotally secured to the bracket 48 by means of pin 47. A camming pin 133 is positioned in the free end of the valve element actuating rod 131 to extend transversely across the slot 132 and for contact with cam lever 49.

It will be appreciated that the valve body 124 and the actuating rod 131 rigidly connected thereto serve as a cam follower for the cam lever 49 by virtue of the spring 130 biasing the valving element 124 into resilient contact with the camming surface of the cam lever 49.

The conduit 120 terminates in a fitting 134 threadedly retained by the valve body 121 and communicating through a passage 135 and a registering passage in the liner 123 with the interior of the valve. A second opposed and aligned passage 136 in the valve body 121 (Figures 8–10) establishes communication between the valve interior and a conduit 137 secured to the valve body by means of fitting 138. The conduit 137 communicates through a second fitting 138a with the venturi air passage 40 of the carburetor C.

The valving element 124 is provided with a peripheral groove 139 which is registrable with both the passages 136 and 135 and with a radial passage 139a registrable only with the passage 135 when the valving element is in an adjusted position and when the valve element is operated from said adjusted position, respectively. At other operated positions for the valving element the communication between the passages 135 and 136 is interrupted by the valving element 124 and passage 135 is vented to the atmosphere through the passage 139a, the recess 129, the bore 127, and the cap 128. In this manner, it will be seen that valving elements 124 control communication of the conduit 120 with the inlet-manifold vacuum of the engine E. It will also be appreciated that the subjection of the chamber A to manifold vacuum is thereby controlled by the adjusted position of the valving element as determined by the setting of the cam lever 49 as determined by the position of the accelerator pedal P. The operation of the control valve CV to control communication of the servomotor M with the venturi passage 40 is best illustrated in Figures 25 and 26.

CLUTCH CONTROL MEANS

(A) Torque-actuated valve

In Figures 17–21, inclusive, it will be seen that the rivets 85 which bind the clutch disc 81 to the balancing ring 84 pass through enlarged notches 140 peripherally spaced about the outer surfaces of the hub flange 82. These notches accommodate limited rotational travel in either direction of the balancing ring 84 and of the clutch disc 81 relative to the hub 80 prior to concurrent movement of the hub flange 82 and therefore the integrally formed hub 80.

A torque-actuated valve "TV" is provided to control the bleeding of air from the chamber B of the servomotor M and thereby control first-stage spring-engaging action of the clutch CL as will hereafter be more fully described.

It will also be seen from Figures 14 and 17–21, inclusive, that the balance ring 84 is provided with a rearwardly extending integrally formed embossment 141 concentric with and surrounding the rearmost end of the splined shaft portion 79. The embossment 141 carries thereon radially inwardly extending pins 142 which engage corresponding notches 143 extending axially into the end of a sleeve extension 144 of a valve element 145 (Figure 24). The sleeve extension 144 is concentric with and rotatable upon the shaft 78, while the cooperating pins 142 and slots 143 accommodate relative axial movement between the valve element 145 and the embossment 141 of the balancing ring 84.

As best illustrated in Figure 23, the valve element 145 includes a cylindrical hub 146 having at either end thereof radially outwardly extending peripheral flanges 147 and 148. The space between the flanges 147 and 148 and surrounding the hub 146 is indicated generally by reference character "S," and the space S communicates with the interior of the hub through a radial fluid passage 149.

The shaft 78 telescopically receives the valve element 145 and that portion 150 of the shaft extending through the bore of the hub 146 forms a second valving element. More particularly, as best shown in Figure 23, the shaft portion 150 is internally recessed, as at 151, and a radial bore 152 in the shaft portion 150 is in communication with the interior of the hub 146 and the recess 151. The shaft rearwardly of the portion 150 is radially enlarged, as at 153, and the enlarged shaft portion is likewise provided with an internal recess or bore 154 which is provided with radial passages 156 communicating with the interior of the transmission casing 76. An atmospheric vent cap 157 is provided on the casing section 74 to vent the shaft chamber 154 to atmosphere through the passages 156.

Communication between the space S of the valve element 145 and the chamber B of the servomotor M is established by means of a conduit 158 secured to the casing section 74 through fitting 159 and with a branch fitting 160 having a line 161 communicating with the interior of the motor (Figure 1). The branch fitting 160 also communicates with an additional conduit 162 which is secured through a fitting 163 with a fluid motor "FM."

Figure 18:
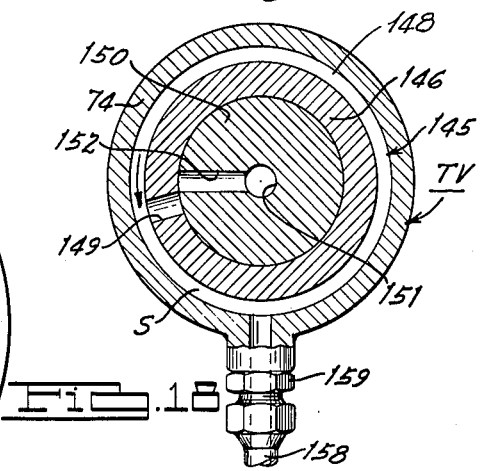
Figure 18 is a cross-sectional view similar to Figure 16, but showing the valve passages in shut-off position at the point of initial contact of the clutch elements.

It will be seen from the foregoing description of the clutch and of the valve elements 145 and 150 that the valve TV is torque-actuated as will be hereinafter more fully explained. The valve element 145 is adapted to be locked to the balancing ring 84 through the pins 142, so that these elements are capable of relative axial movement while still being locked together for rotative movement. The cushioning and torque springs 83 of the clutch CL perform a dual function; first, the springs absorb shock and vibration when the clutch is engaged to accommodate smooth clutching engagements; and secondly, the springs function to provide relative yieldable movement between the clutch disc 81 and the hub 80. The cushioning springs 83 are of such strength that they predetermine the amount of torque to be transmitted through the disk 81 to cause rotation of valving element 145 relative to the shaft portion 150 as shown in Figures 18 and 26 to interrupt registry of the passages 149 and 152, thereby preventing or restrict bleeding of air from the rear chamber B of the clutch actuating motor M. The hub 80 is splined to the portion 79 of the shaft 78, which shaft 78 has a second portion 150 forming one of the valving elements of the torque actuated valve. Thus, relative rotative movement between the hub and the clutch disk causes the valve elements 145 and 150 to move rotatively relative to one another to bring about or interrupt full registry between the valving passages 149 and 152. However, the extension 144 of the valve element 145 is splined as by circumferentially spaced inwardly projecting radial pins 142 engaging the extension end slots 143, to the balance ring 84 for rotation therewith and to accommodate relative axial movement of the balance ring with respect to the valve extension 144 so that the hub 80 can "float" on splined portion 79 of shaft 78 to compensate for thermal conditions, wear, etc., in clutch mechanism CL.

(B) Fluid motor engine throttle actuator

The fluid motor throttle actuator "FM" (Figures 11 and 12) comprises generally a dished casing 165 having an open top closed by a closure plate 166. The interior chamber of the motor communicates with the conduit 162 through an internal bore formed in a depending boss 167. The piston 168 of the motor FM is of conventional dished configuration and carries on its upper surface and secured thereto for movement therewith an actuating rod 169 projecting upwardly through a fitting 170 carried by the wall 166. The casing 165 is provided with a side aperture 170a which is triangular in outline with the apex of the triangle being formed at the lower end thereof. The aperture 170a communicates with the atmosphere through a breather cap 171 carried by the casing. The piston 168 is urged downwardly within the casing 165 by a compression spring 172 bottomed against the casing cover 166 and acting directly upon the piston 168.

It will be seen that fluid pressures greater than atmospheric pressures in the conduit 162 will force the piston 168 upwardly within the casing 165 against the spring 172, and that, when the piston movement has been sufficient to uncover the side aperture 170a, such excessive pressures will be bled off through the aperture 170a and the breather cap 171.

The actuating rod 169 of the piston 168 projects beyond the casing into contact with a lateral flange 173 formed on the lever arm 46 of the carburetor linkage heretofore described. Upon upward movement of the piston 168 within the casing 165, an upward thrust will be imparted to the lever arm 46 which thrust will be transmitted through actuating arm 45 to the butterfly valve actuation arms 41 and 44 of the carburetor butterfly valve 41. In this manner, upward movement of the piston will cause opening of the butterfly throttle valve of the carburetor independently of movement of the accelerator pedal.

MODIFIED TORQUE-ACTUATED VALVE

In Figures 28–33, inclusive, of the drawings there is illustrated a modified form of a torque-actuated valve, indicated generally as "TVM."

Identical reference numerals on these figures refer to identical portions of that form of the valve illustrated in Figures 16, 18, 22 and 23.

Actually the only structural difference between the valve of Figures 28–33 with that hereinbefore described, is the provision of a circumferentially elongated radial port 149a for that aperture 149 hereinbefore described in the hub 146 of valve element 145. However, the valve illustrated in Figures 28–33, inclusive, functions to cause partial restriction of the air flow from the rear chamber of the servomotor M by the more or less exact registry of the ports 152 of the valving portion 150 of the chamber 78 with the port 149a of the element 145 as illustrated particularly in Figures 27–32.

The operation of this modified form of the valve will be more fully described hereinafter in connection with other portions of the complete device of the present invention.

OPERATION

Referring now to the operation of my improved clutch control mechanism, let it first be assumed that the accelerator pedal is fully released so that the butterfly valve 41 of the carburetor C is in its closed position to cause idling of the engine. Under such conditions, the friction clutch CL will be fully disengaged, this disengagement being effected by the opening (groove 139 in registry with passages 135–136) of the control valve CV when the accelerator pedal P is in fully released position, inasmuch as the spring 59 will cause the rotation of the cam lever 49 so that the cam follower pin 133 is beyond the camming surface 50 of the lever arm.

In this position of the lever arm, the spring 130 is effective to move the valve body 124, so that communication is established through the valve body groove 139 between the inlet manifold of the engine E and the conduit 120. The forward chamber A of the fluid motor M is thus placed in direct communication with the engine manifold and differential fluid pressure is effective on the movable piston 94 of the fluid motor to cause the piston to be moved into the position shown in Figures 1 and 25.

Movement of the piston 94 to its forwardmost (leftward) position is facilitated by the free flow of air into the rear (right) chamber B through the check valve 107 of the servomotor M. The employment of the check valve 107 is necessary due to the covering of the radial passage 106 by the motor end plate embossment 96 when the piston 94 starts to move from its extreme rearward position to its extreme forward position. Also, while a restricted amount of air could be drawn into the chamber B through the registering passages 149 and 152 of the torque-controlled valve 145, this flow is restricted because of the size of the passage. Therefore, the check valve 107 is necessary to accommodate free flow of air at substantially atmospheric pressures into the motor chamber B, thereby facilitating rapid disengagement of the clutch elements by the effective exertion of differential pressures across the piston 94.

Actual disengagement of the clutch CL is effected by rearward movement of the pressure plate 64, this pressure plate movement being caused by axial forward movement of the throw-out bearing 71 on the shaft 78 by actuation of the throw-out bearing fork 88 linked directly to the motor actuating arm 95 (Fig. 25). Thus, the clutch being disengaged, drive torque is interrupted through the clutch from the engine E to the wheels of the vehicle.

If it should be desired to re-engage the clutch CL, as for example, in starting the engine from a stopped position with a lower gear ratio established, or after changing a speed ratio of the gearing when the vehicle is moving, it is only necessary to depress the accelerator pedal P. The initial depression of the pedal P (as indicated in dotted outline in Figure 1 and in full outline in Figures 2, 6 and 26), will cause the valve CV to assume the operated position shown in Figures 6, 9 and 10. This movement of the valve is effected by rearward movement of the actuating arm 53 linked to the pedal P and lever arm 49 to bring the camming surface 50 into contact with the follower pin 133, thus urging the valve element 124 rearwardly against the action of the spring 130, thereby axially moving the valving element 124 so that the groove 139 is out of registry with the passages 135 and 136 and the radial passage 139a in registry with passage 135 only, thus venting the forward chamber of the servomotor M to the atmosphere through the spring recess 129, the bore 127, and the cap 128. The body of the valving element 124 is thus interposed between the conduits 120 and 137 to shut off communication of the forward chamber A of the servomotor M with intake manifold vacuum of the engine B and to vent said chamber to the atmosphere.

Instantaneously with the interruption of intake-manifold vacuum in the chamber A, the differential pressure on the piston 94 will increase and the pressure plate compression springs 69 and the tension spring 115 in the throw-out bearing linkage will urge the piston 94 of the motor M rearwardly, with the throw-out bearing tension spring 70 aiding in this motion and urging the throw-out bearing rearwardly from its forward throw-out position in which it was formerly effective on the throw-out arm 65. This movement of the piston 94 and the clutch elements, including the clutch pressure plate 64, will continue to substantially the position shown in Figure 2, at which point the clutch elements, that is, the clutch friction facings 86 and 87, the flywheel 61 and the pressure plate 64, will initially contact. Upon the establishment of such initial contact, a predetermined torque will be transmitted to the torque-controlled valving elements 145 and 150 by the overcoming or additional stressing of the torque springs 83. The torque-damping or transmitting springs 83 thus define a predetermined torque-transmitting capacity which must be exceeded prior to relative movement of the torque-operated sleeve valve TV, which, when once actuated, then serves as a torque-modulator means during initial partial engagement of the clutch elements. It will be noted from Figure 2 that the clutch throw-out bearing 71 still contacts the throw-out arm 65, so that the clutch pressure plate 64 is not fully engaged under the compression of the springs 69.

The air which is locked in the rear chamber B of the servomotor M when the accelerator valve 41 is initially operated by depressing the accelerator pedal P to increase engine speed is utilized to inaugurate the engaging action of the clutch elements according to torque conditions existing in the clutch mechanism and supplemented under certain torque overload and throttle conditions by automatic actuation of the throttle to increase engine speed. The pressure lines 158—162 affected by the torque-control valve TV in controlling the engagement of the clutch frictional elements carries torque-modulated pressure induced in servomotor chamber B by the spring-engaging action of said clutch elements aforesaid with the torque-valve TV closed until the clutch is substantially fully engaged. This modulated pressure is increased by the engaging action of the clutch springs 69 upon initial contact of the friction elements thereof and is effective to operate the engine throttle air motor FM to increase engine speed responsive to this latter modulating action whereby second-stage spring-engaging action of the clutch frictional elements 86 and 87, into fully engaged condition is effected to prevent engine stalling, as will be hereinafter more fully explained.

At this time; i. e., the period of partial clutch engagement, the position of Figure 2 has been obtained, and the torque valve elements are in their relative positions shown in section in Figure 18 and in schematic form in Figure 26, and the torque valve is closed, thereby preventing the bleeding of air therethrough. Due to the one-way action of the motor bleed valve 107 and the shutting off of the torque valve TV, further movement of the piston 94 of the servomotor M will result in compression of atmospheric air confined within the rear chamber B of the motor M, and this pressure will be proportionately transmitted through the conduit 162 to the fluid motor FM mounted on the bracket 48 and underlying the carburetor C.

Fluid under pressure entering the fluid motor FM will force the piston 168 of this motor upwardly within the casing 165 against the action of the spring 172. Movement of the piston 168 will, of course, be accompanied by vertical extension of the piston-actuated rod 169 beyond the motor casing 165 into contact with the flange 173 of the arm 46. This upward thrust exerted on the arm 46 by the piston arm 169 will cause corresponding upward movement of the butterfly actuating arm 45, thereby opening the throttle, or butterfly valve 41, a slightly additional amount in case the accelerator pedal has not been further moved from its initial slightly depressed position as shown in Figure 1 in dotted outline. Thus, the speed of the engine will be increased a slight, predetermined amount to compensate for the driving torque imposed on the transmission T by the partial engagement of the clutch elements initially actuated by movement of the actuating rod 94 of the motor M.

As the piston 168 of the fluid motor FM reaches approximately its central position within the casing 165, the entrapped modulated pressured air in the clutch motor M will vent through the triangularly-shaped orifice 170a, to thereby relieve air pressure within the chamber B of the motor M, thus accommodating further movement of the piston 94 under influence of the clutch engaging springs 69, the piston-actuated rod 95 and the clutch-actuating linkage to cause continued movement of the clutch elements until the clutch reaches its fully engaged position.

When the piston 94 reaches its fully released position, as shown in Figure 3, it will be seen that the axial motor rod passage 104 will be vented to the atmosphere through the radial passage 106 clearing the end of the embossment 96 of the motor casing plate 93, thereby venting the modulated air pressure remaining in the chamber B through the passage 105 within the chamber B and communicating with the axial passage 104. This final venting of compressed air from within the chamber B releases the piston 168 of the fluid motor FM to assume its normal lower position under the influence of the biasing spring 172. Thus the carburetor butterfly valve 41 is returned to the position established by the accelerator pedal P, inasmuch as the arm 46 is released to return under influence of the spring 52 to its position of rest on the underturned flange 51 of the cam lever 49. Thereafter, the accelerator pedal will be effective to operate the butterfly valve 41 in a normal manner without assistance or interference from the piston 168 of the fluid motor FM.

The torsional spring 52 interposed between the arm 46 and the cam lever 49 serves to retain the members 46 and 49 for movement in unison when the motor FM operates simultaneously with accelerator depressing movements, as shown in Figure 1, or to accommodate movement of the arm 46 relative to the cam lever 49 when the fluid motor FM is operated relatively to the accelerator, as when the accelerator pedal has been halted at a point insufficient to increase the engine speed or overcome the torque load to be moved as hereinbefore explained.

Figure 16:
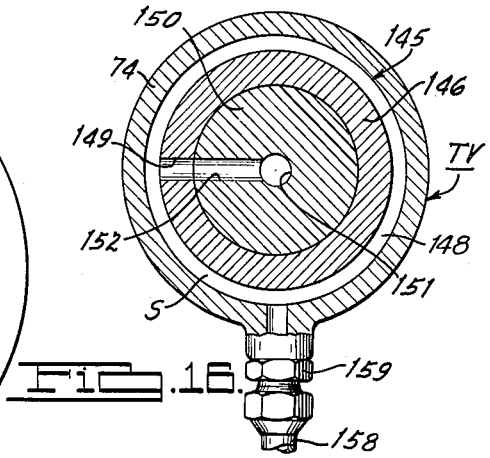
Figure 16 is a cross-sectional view of the torque-actuated valve taken on the line 16—16 of Figure 14.
Figure 20:
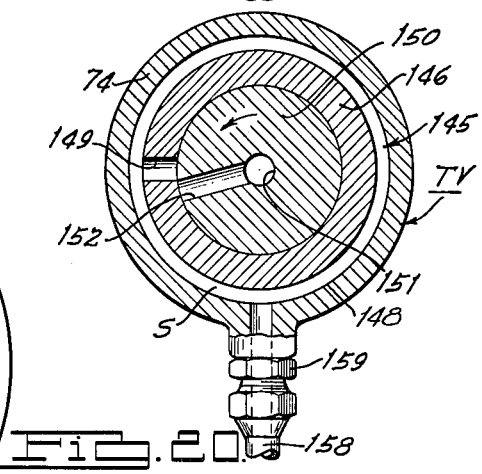
Figure 20 is a cross-sectional view similar to Figures 16 and 18 but showing the position of the valving passages when the vehicle drives the engine as by coasting.

When the torque valve TV, composed of the elements 145 and 150, is opened; i. e., in the position of Figure 16 as when the clutch is fully disengaged, the throttle motor FM will remain inoperative, inasmuch as the chamber B of the clutch motor M will be vented to the atmosphere through the torque valve apertures 149 and 152, but when the torque valve apertures are restricted or completely closed, as in Figures 18 and 20, the throttle motor FM will be operated to actuate the throttle to a wider open position in case the operator has failed to compensate for the increased torque load imposed on the engine, as in starting the vehicle. This feature of the present invention is novel and quite important by preventing the stalling of the vehicle under any operating conditions at which time the torque load is greater than that anticipated by the operator but if the vehicle is started by progressively depressing the accelerator P, the piston element 168 of the valve means defined by said piston and the aperture 170a of the throttle motor FM will move in unison therewith to uncover the aperture 170a thereby overruling the clutch engaging control action of the torque valve TV to enable spring-engaging action of the clutch to fully engage the same.

The operation of the modified form TVM of the torque-actuated valve illustrated in Figures 28 to 33, inclusive, is substantially the same as that hereinbefore explained. Although this form of valve functions to cause only partial restriction of the modulated air flow from the rear chamber B of the clutch motor M, the restriction of air flow is sufficient to be effective in opening the throttle butterfly valve 41 in case the operator fails to follow through on the opening of the throttle by the accelerator pedal. However, by the provision of the circumferentially elongated venting port 149a in the valve element 145, modulated air trapped in the rear chamber of the servomotor M will be bled off through the partial restriction in the torque valve. In other words, the employment of the modified torque valve, the modulated pressures in the chamber B will never attain the value obtained by the employment of the form of torque valve hereinbefore described, inasmuch as the previous valve completely shuts off air flow from the rear chamber of the motor while the modified valve merely restricts such air flow. Thus, such increased pressures within the chamber B will be less than those originally obtained, so that the carburetor butterfly valve 41 will not be opened to as great a degree due to the limited action of the throttle motor FM. However, it will be understood that in using either the originally described torque valve, or the modified torque valve, the continued depression of th epedal P without hesitation at dash line accelerator pedal position shown in Figure 1, will cause the correlated blending of the increased speed of the engine, the engaging action of the clutch elements, and the picking up of the torque load required to start the vehicle.

The throttle motor FM thus serves, as its main purpose, to prevent stalling of the engine. Such stalling has been a problem in prior art power-controlled clutches, and this problem has been entirely eliminated by the device of the present invention. Further, the prior art power-operated clutches have not provided torque-responsive means for establishing the point at which the clutch elements initially contact inasmuch as facing wear, heat and other factors constantly change this point of contact. In the present invention, the control of the final second-stage engaging movement of the clutch elements is established and regulated in accordance with the amount of torque put through the clutch elements by the engine. Thus, smooth, uniform clutch-engaging action is obtained under all operating conditions and the possibility of stalling has been obviated, even under those conditions where the operator has failed to open the throttle sufficiently to enable the torque-responsive means to take over. It will also be noted that the torque-responsive means controls the opening of the throttle only to that degree necessary to compensate the torque load imposed on the engine and, after the vehicle is underway, the throttle is returned to the position established by the operator with the operator thereafter assuming full control of the vehicle operation by normal manual accelerator pedal manipulation. If in starting the car, the operator is careless in properly accelerating the engine to get underway, this lack of torque will be reflected in the flexing of the torque-damping springs 83 which in turn will modulate the escape of air from the rear chamber of the suction clutch actuator M to reduce the rate of clutch engagement (slipping condition). This retardation of the rearward movement of the servomotor piston 94 will naturally build up increased air pressure within the rear chamber B and pressure modulated air line to the torque-controlled valve 145 through which the air escape is controlled. This momentary increase in air pressure will be directed against the piston of the throttle motor 169 and thus open the throttle 41 notwithstanding the operator has failed to follow through on the pedal. Thus the engine speed is increased, the rate of clutch engagement slowed so that the increasing torque may be effectively transmitted through the clutch elements by slip to the vehicle driving wheels until a non-slipping condition of engagement is reached accommodating full transmitting or torque from the engine to the driving wheels without loss. This sequence of clutch engaging control is highly ideal and it frees the operator of having to be accelerator pedal conscious to prevent a stalled motor in starting the vehicle irrespective of the load and/or road conditions involved. Furthermore, a fast getaway is always available by stepping hard on the gas pedal, but this high torque condition still cannot overload the engine due to the torque-modulated control of the rate of engagement of the frictional clutch elements.

It will also be noted that the circumferentially spaced springs 83 about the splined hub 80 of the clutch driven member 82 perform a dual function; i. e., (1) a damping action to damp out torsional vibration and thus eliminate "gear clatter" in transmission T and to prevent subjecting the vehicle drive mechanism to shock application of torque and the resultant discomfort to the occupants of the car and excessive wear and strain on the mechanism; (2) a torque-transmitting function such that these springs are designed to carry, from the engine to the input of the transmission drive T, a predetermined torque before yielding to operate the sleeve valve 145 relatively to the transmission input shaft portion 150. This yielding is effected by initially depressing the accelerator pedal P from engine idling position to inaugurate movement of the clutch elements to make initial contact under slipping-drive conditions. If the torque input through these springs 83 is sufficient to move the vehicle, then the torque-valve 145 will not come into action, but if the engaging condition of the frictional elements 86 and 87 of the clutch engage too fast for the torque available, then the torque-valve 145 will operate to modulate the rate of engagement so that the engine will maintain speed for the torque present and no stall will result. Thus, the operating results of this new torque-clutch simulate the torque-transmitting characteristics of a fluid-coupling or torque-converter.

The correlation of the torque-springs 83 and the torque-responsive valve TV and TVM is perhaps best illustrated in Figures 16-21. In Figures 16-17, the torque-springs 83 are inactive in their normal cushioning stressed condition with the valve in full-open position, this condition resulting when the clutch is fully disengaged, or when the clutch is engaged under a torque-load insufficient to compress the springs 83 beyond their normally prestressed condition.

Figure 19:
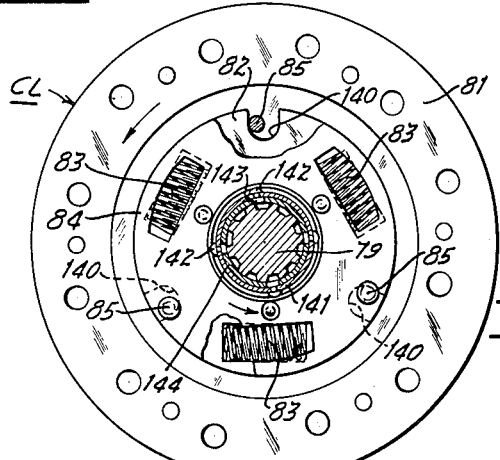
Figure 19 is another view of the clutch assembly showing the parts in position corresponding to the valve passages shown in Figure 18.

In Figures 18-19, the torque-load is in excess of the torque-capacity of the springs 83, as when the clutch is engaging, and therefore, the springs 83 have been additionally compressed to bring the rivets 85 into contact with the edges of the corresponding apertures or slots 140, thus causing co-rotation of the clutch elements 82 and 84. This compression of the springs 83 compensates for limited relative rotational movement of the valving elements TV or TVM, thus either completely or partially closing the registering torque-valve orifices, the degree of valve closure being dependent upon the exact torque-load and/or the valve construction; i. e. whether the valve TV or TVM is employed. Of course, the degree of valve closure effects the complete or partial arresting of clutch element movement to fully engaged position.

Figure 21:
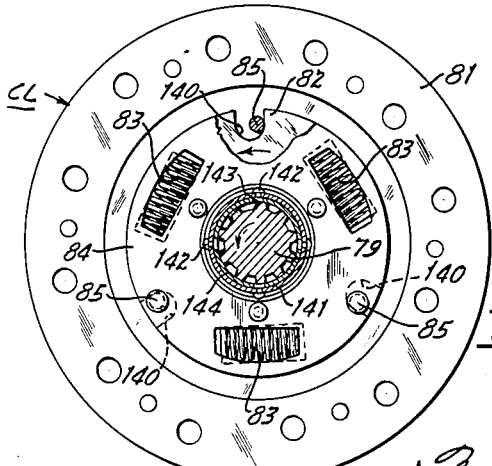
Figure 21 is a view similar to Figures 17 and 19 but showing the position of the relatively moving parts comprising the clutch frictional disc when the torque-actuated valve is moved to the position shown in Figure 20.

In Figures 20-21, the vehicle is operating under "coasting" or non-driving load, which effects a reversal in torque-load, causing the vehicle to drive the engine. This condition may arise under actual operating conditions, as upon a sudden release of the accelerator pedal. Thus, the torque-valve elements are relatively rotated in the same direction as that above described in connection with Figures 18-19, but the vehicular drive shaft now drives the engine to move the torque-valve orifices out of registry, thereby again arresting clutch engaging movement.

It is impossible to stall the engine irrespective of the mode of manipulation of the accelerator pedal-fast-slow, partially opened and so held, etc. The torque-control takes over and, if need be, will completely arrest movement of the clutch elements toward fully engaged condition. However, it is believed that only a retarding action will result in most driving with a car equipped with this type of clutch mechanism because in starting the operator usually presses through on the gas pedal until underway and then sets the pedal at the speed desired. In pressing through on the throttle as aforesaid, a perfect modulated engagement results simulating that of an expert driver in manually regulating the clutch into engagement.

With respect to the behavior of the accelerator motor FM to increase engine speed to prevent stalling or reduction of the speed of engine when the clutch starts to engage, if the torque valve completely closes to arrest movement of the clutch elements toward engaging condition, then the motor is accelerated, but if only a retarding function of the clutch elements is effected as by partial closing of the torque valve, then the motor will not accelerate so high.

This means that the engine acceleration above a predetermined throttle position by the operator depressing the accelerator is proportional to the torque-capacity of the clutch; i. e., if the engine is accelerated in proportion to the load to be moved there will be less increase in engine speed by the accelerator motor, but if the operator fails to so accelerate the engine then the engine would increase more in speed by function of the accelerator motor. If this action of the drive system were not provided, the engine would stall since the clutch engages faster than the available torque from the engine can pick up the load, and as a result the engine will stall for lack of proper coordination of engine speed and the torque load imposed thereon.

With particular reference to the valve TVM of Figures 27–33, the rotational movement of the sleeve valve as determined by the mating slots in the clutch disc and splined member, can be so established that the bleed-off orifice or passage in the input shaft is never fully closed when the engine is driving the car—therefore only a retarding control is effected in engaging the clutch as a limited amount of air can escape through this partially closed port according to the torque requirements. The port will vary from wide open to substantially half closed condition or more if necessary to properly control the engaging action of the frictional elements of the clutch.

Thus, the modified form TVM of the torque valve is particularly useful when associating the clutch with an automatic change-speed gearing or a manually-shifted gear box. In both automatic and manually shifted gear boxes, it is customary to take the foot momentarily from the gas pedal at which moment a reversal of torque drive occurs—that is, the vehicle momentarily drives the engine, and thus relieves the "pinch" on the gearing—so that shifting is facilitated either automatically or manually. It is undesirable during such a shifting operation to utilize the torque control feature of my clutch as the car is running, and all that is needed is to disengage the clutch and upon completion of the shift to release the clutch into immediate re-engagement just as we drivers do when driving a standard personally-controlled shift and clutch equipped car. The clutch engagement is delayed when starting the car but, when the car is underway, it is desirable to declutch, shift, and reclutch without hesitating so that upon opening the throttle to continue the drive there will be no interruption in the acceleration except during the shift. To accomplish the latter driving sequence, the elongated slot 139a is sufficiently long circumferentially, to make sure that when the input shaft rotates relatively to the sleeve upon reversal of torque drive as noted above, that the radial passage in the input shaft is never closed but remains fully open, so that the torque controlling feature of the sleeve valve is rendered ineffective when operated responsive to such torque reversal.

It will, of course, be appreciated that different forms of differential pressure means may be employed to actuate the servomotors M and FM, as for example, the employment of vacuum, air pressure, or hydraulic fluid pressure. The advantages of the present invention over those devices hereinbefore proposed in the prior art will be readily appreciated by those skilled in the art.

In the normal dis-engaged condition of the clutch due to the vacuum-motor M being energized, the air in the rear chamber B of this motor is at normal atmospheric pressure. But when the accelerator is initially depressed from its engine idling position, the energized condition of the motor no longer exists since the vacuum is cut off from the forward chamber A and vented to atmosphere. This control action of the accelerator pedal also causes or rather results in the air confined in the rear chamber B of the motor being locked or trapped from escapement therefrom except through the ports of the torque sleeve valve. As this latter valve comes into action it convertes the escaping air from the rear chamber in regulating the clutch toward final engaged condition, into what may be termed "torque-modulated pressure." The accelerator is initially depressed, the air at atmospheric pressure is instantly raised in pressure due to rapid movement of the clutch elements toward initial engaged condition by springs 69, then the torque valve comes into action to modulate this pressure according to the torque condition or transmitting capacity of the clutch elements as defined by the torque-damping springs 83. In other words torque-modulated fluid pressure regulates the clutch elements into final engagement after initial rapid engagement is brought about by depressing the accelerator as aforesaid.

It will be noted that the locked-raised pressure of the air in the rear chamber, or the modulated-pressure by torque is utilized to operate the throttle motor FM. If the gas pedal is just "cracked" beyond engine idling condition, and the operator holds the pedal in this position, the air pressure will raise instantly due to the clutch engaging springs 69 closing the clutch elements very rapidly, and thus pulling the clutch motor piston rearwardly; but the instant the torque valve comes into action, then the throttle is regulated by this torque-modulated pressure if the driver continues to be lazy on the gas pedal.

Further discussing the operational behavior of the torque-valve TV, it is important to note that the weight of the torque-springs 83 determines the amount of torque transmittible by the clutch frictional members in partially engaged "slipping" condition, during limited relative rotational movements of the clutch member 81 and the driven shaft 78 to actuate the aforesaid valve to establish the clutch members in said drive "slipping" condition. While the aforesaid arrested "slipping" condition may be adjusted to transmit torque to the vehicle wheel sufficient only to possibly move the vehicle at a "creeping" rate of propulsion if the vehicle is not on an upgrade, in which latter condition, the vehicle could be prevented from a "rollback" by properly adjusting the accelerator to place the annular port 139 of the control valve CV in partially closed condition whereby chamber A of the servomotor M is only partially evacuated. This vehicle "holding" operation is brought about in the followign manner: With the vehicle stopped on an upgrade or as coming to a rolling stop on such a grade, the operator on depressing the accelerator to a point wherein the valve CV is partially open to provide a lowered vacuum effect in the chamber A of the servomotor M with consequent reduced differential pressures acting across the piston 94, produces a retarded spring-engaging action of the clutch frictional members under control of the accelerator whereby the modulated pressures in chamber B are correspondingly reduced despite closure of the torque-valve TV, such modulated pressures being insufficient to actuate the throttle motor FM to open the engine throttle due to the counter-balancing effect of the clutch engaging springs 69 and the pressure differentials acting across the servomotor piston by reason of the partially evacuated vacuum chamber A. From the foregoing, it is apparent that the present invention enables the operator to control the clutch CL into a drive "slipping" condition for holding the vehicle on upgrades simulating the inherent torque-transmitting "slip" characteristics of a fluid-coupling or torque-converter, as is well understood; whereupon operating the accelerator to further increase engine speed, the valve element 124 of the control valve CV is moved leftwardly to place the air port 139a in registry with the vacuum and air port 135 causing vacuum chamber A of the servomotor to be vented to atmosphere via the reduced passage 127 and cap 128 with consequent increase in the modulated pressure in chamber B sufficient to operate the throttle actuating motor FM to the position of Figure 12 wherein the chamber B is vented to atmosphere via conduit 162, aperture 170a and breather cap 171, to enable the spring-engaging action on the clutch members to fully engage the clutch.

In addition, an important feature of the novel throttle-actuator FM resides in the control of the piston 168 responsive to accelerator operation. This piston in conjunction with the aperture 170a forms the previously mentioned valve means for controlling egress of super-atmospheric pressures from chamber B of the clutch servomotor M produced by closure of the torque-valve TV responsive to predetermined spring engagement of the clutch frictional elements when the accelerator P is sufficiently depressed to vent chamber A of the servomotor to atmosphere via the reduced passage 127 and breather cap 128 of the control valve CV. The aforementioned piston is adapted to move in unison with accelerator depressing movements, or to operate relatively with respect to the accelerator to open the engine throttle through a predetermined range of throttle opening. The mode of operating the accelerator in starting the vehicle influences the degree of resistance offered by the torsional spring 52 to movement of the piston 168 to produce the aforesaid operation of the piston 168 for controlling egress of modulated pressures through the aperture 170a. That is to say, if the accelerator is progressively depressed from engine idling position until the friction elements of the clutch are established susbtantially in fully engaged condition, the preloaded status of spring 52 would be maintained enabling the piston 168 to operate in unison with such movements of the accelerator to thus vent chamber B to atmosphere via aperture 170a whereby the closed condition of the torque-valve TV is overruled; but if the accelerator is paused after slightly accelerating the engine, closure of the torque-valve TV would instantly raise the pressure in the chamber B sufficietnly to overcome the preloaded status of the spring 52 thereby operating the piston 168 to further open the engine throttle relatively to such paused position of the accelerator and thus avoid stalling of the engine. Accordingly, the rate of fluid pressure flow through the aperture 170a to overrule air pressure modulation caused by the torque-valve TV when actuated to partially or fully closed position, is controllable by the accelerator at the will of the operator, or automatically relatively to the accelerator responsive to super-atmospheric pressure created in chamber B of the clutch servomotor M when the accelerator is halted within the predetermined range of throttle opening from engine idling position.

Thus, the present clutch control mechanism provides the vehicular "holding" advantage aforesaid responsive to either accelerator manipulation or actuation of the torque-valve TV to closed condition, with clutch engagement being inaugurated by an operator-responsive, accelerator-actuated means through a first movement thereof; engaging movement of the clutch friction elements or members, up to establishment of a predetermined "slipping" torque transferal relation, being under the control of mechanism directly responsive to torque conditions within the clutch and independent of further accelerator movement; and final engaging movement of the clutch friction elements being responsive to accelerator control movable through a second movement thereof or operation of said throttle motor FM upon actuation of the aforesaid torque-responsive mechanism to operating position. In this manner, the critical period of clutch element movement into partially engaged condition is controlled independently of vehicular operating conditions and/or accelerator manipulation following the inauguration of the clutch friction members into the partially engaged relation aforesaid, while accelerator control of the overall rate of clutch engaging action is maintained to suit the individual desires and driving habits of the operator. Thus, accurate and uniform clutch control to arrested "slipping" or retarded rate of engaging action into fully engaged conditions, are always available irrespective of the extent of wear on the clutch parts or vehicular operating conditions, according to the operator's mode of driving.

The foregoing description is believed to set forth clearly the achieving of the various stated objects of my invention and to describe the advantageous results to be derived therefrom.

It will be understood that the accompanying illustrations are given as an example of presently preferred embodiments of the invention, and that persons skilled in the art may make either substitutions for or supplement the structure of my invention without departing from the spirit and scope of the novel concepts thereof as defined in the claims appended hereto.

I claim as my invention:

1. In an automotive power-transmitting system including a torque producing internal-combustion engine controlled by a throttle responsive to an operatable accelerator mechanism having two extreme positions, and a spring-engageable friction clutch drivingly connected to the engine for transmitting the torque to an output shaft: a source of pressure fluid different from atmosphere including a conduit system having three branches for conveying the same; a fluid-pressure-responsive servomotor comprising two fluid chambers isolated by an alternately movable power element; means operatively connecting the power element with the clutch; control valve means operable for placing one of said chambers in communication with said source via one of said conduit branches to cause energized movement of the power element in one direction to operatively disengage the clutch in opposition to the spring-engaging action, in response to operating the accelerator mechanism to one of its extreme positions, and for interrupting such fluid-pressure communication whereby movement of the power element is controllable in the opposite direction to cooperatively enable spring-engagement of the clutch upon predeterminately operating the accelerator mechanism from said one extreme position; torque-responsive valve means operatively incorporated between the clutch and output shaft normally accommodating the other servomotor chamber to be charged with fluid at atmosphere pressure via another of said conduit branches during clutch disengagement, and being further adapted to modulate such atmospheric condition in response to initial spring-engagement of the clutch to arrest the power element movement in its opposite direction thereby establishing the clutch in partially engaged condition; fluid-pressure-responsive means interposed in the third conduit branch and having a power element movable in response to the aforesaid modulated fluid pressure for actuating said throttle to accelerate the engine independently of further operation of the accelerator mechanism; and means effective upon such actuation of said throttle for controllably restoring atmospheric pressure in said other servomotor chamber to accommodate further movement of the first-named power element under influence of the clutch spring-engaging action to fully engage the clutch, and to restore actuation of the throttle to the accelerator mechanism.

2. An automotive power-transmitting system according to claim 1 wherein the last-named means comprises the servomotor power element and which is operable to interrupt application of the clutch-engaging modulated fluid pressure to the said fluid-pressure-responsive throttle means to thus restore control of the throttle to operation of the accelerator mechanism, upon full engagement of the clutch.

3. An automotive power-transmitting system according to claim 1 wherein said torque-responsive valve means include a movable element actuated to closed condition by initial spring-engagement of the clutch for arresting movement of said clutch through partially engaged condition by controlling said servomotor to oppose the clutch spring-engaging action, in response to aforesaid operation of said accelerator mechanism.

4. An automotive power-transmitting system according to claim 1 wherein said torque-responsive valve means include a movable element actuated to partially closed condition by initial spring-engagement of said clutch for retarding the rate of movement of said clutch through partially engaged condition into fully engaged condition by controlling said servomotor to oppose the clutch spring-engaging action, in response to the aforesaid operation of the accelerator mechanism.

5. In control means for friction clutches having driving mechanism and a driven mechanism comprising at least two members, actuatable into partially and fully engaged conditions to transmit torque at different efficiencies, and into disengaged condition to interrupt transmission of torque; pre-energized spring means for engaging said clutch mechanisms, an actuator for actuating said clutch mechanisms into fully disengaged condition in opposition to the force of said spring means, and for controlling said clutch mechanisms in cooperation with said spring means into engaged condition; an element operatively connected with one of said driven members; torque-transmitting spring-loaded means operatively interconnecting said two driven members to accommodate limited relative movement therebetween in opposition to said spring load upon subjecting said driven members to a predetermined torque load; means defining said limited relative movement between said driven members; control means including a personally-operable member operatable sequentially through first and second movements; torque-responsive means including an element operatively responsive to the first-named element for actuation thereby to operating position during the aforesaid relative movement of said driven members, in response to first movement of said personally-operable means to cause the actuator to accommodate movement of said clutch mechanisms into partially engaged condition by said spring means; and means controlled by the torque-responsive means actuated to operating position in the manner aforestated to enable the actuator to controllably arrest movement of said clutch mechanisms by said spring means in their aforementioned partially engaged condition.

6. In control means for friction clutches having driving mechanism and a driven mechanism comprising at least two members, actuatable into partially and fully engaged conditions to transmit torque at different efficiencies, and into disengaged condition to interrupt transmission of torque; pre-energized spring means for engaging said clutch mechanisms, an actuator for actuating said clutch mechanisms into fully disengaged condition in opposition to the force of said spring means, and for controlling said clutch mechanisms in cooperation with said spring means into engaged condition; an element operatively connected with one of said driven members; torque-transmitting spring-loaded means operatively interconnecting said two driven members to accommodate limited relative movement therebetween in opposition to said spring load upon subjecting said driven members to a predetermined torque load; means defining said limited relative movement between said driven members; control means including a personally-operable member operatable sequentially through first and second movements; torque-responsive means including an element operatively responsive to the first-named element for actuation thereby to operating position during the aforesaid relative movement of said driven members, in response to first movement of said personally-operable means to cause the actuator to accommodate movement of said clutch mechanisms into partially engaged condition by said spring means; and means controlled by the torque-responsive means actuated to operating position in the manner aforestated to enable the actuator to controllably retard the movement of said clutch mechanisms by said spring means through their aforementioned partially engaged condition.

7. In control means for friction clutches having driving mechanisms and a driven mechanism comprising at least two members, actuatable into partially and fully engaged conditions to transmit torque at different efficiencies, and into disengaged condition to interrupt transmission of torque; pre-energized spring means for engaging said clutch mechanisms, an actuator for actuating said clutch mechanisms into fully disengaged condition in opposition to the force of said spring means, and for controlling said clutch mechanisms in cooperation with said spring means into engaged condition; an element operatively connected with one of said driven members; torque-transmitting spring-loaded means operatively interconnecting said two driven members to accommodate limited relative movement therebetween in opposition to said spring load upon subjecting said driven members to a predetermined torque load; means defining said limited relative movement between said driven members; control means including a personally-operable member operatable sequentially through first and second movements; torque-responsive means including an element operatively responsive to the first-named element for actuation thereby to operating position during the aforesaid relative movement of said driven members in response to first movement of said personally-operable means to cause the actuator to accommodate movement of said clutch mechanisms into partially engaged condition by said spring means; and means controlled by the torque-responsive means actuated to operating position in the manner aforestated to enable the actuator to controllably retard the rate of movement of said clutch mechanisms by said spring means through their aforementioned partially engaged condition into fully engaged condition.

8. In automotive power-transmitting systems including a friction clutch having a driving member and a driven member movably engageable for co-rotation in full drive torque transmitting relation, and separable to interrupt transmission of driving torque from an associated prime mover having an actuatable throttle control for varying torque production of said prime mover, said driven member comprising two yieldably interconnected sections adapted for limited relative movement with respect to each other; means biasing said clutch members into engagement; energizable power means operable in opposition to said biasing means for separating said clutch members, and controllable in cooperation with said biasing means to engage said clutch members; means for energizing said power means; control means responsive to initial actuation of said throttle control for rendering said power means control effective, thereby accommodating controlled movement of said clutch members into initial engagement under influence of said biasing means; and means controlled by said limited relative movement of the two sections of said driven member when subjected to torque transmission, upon initial engagement thereof with said driving member, to modulate said power means control only sufficiently effective to controllably oppose said biasing means to arrest said clutch members in their initially engaged relation.

9. An automotive power-transmitting system according to claim 8 wherein the said control means incorporates structure operable in response to actuating said throttle control to a position defining substantially the beginning of the aforesaid initial actuation thereof to cause energization of the said power means to separate the said clutch members against the force of the biasing means.

10. An automotive power-transmitting system according to claim 8 wherein the means controlled by the two sections of said driven member incorporates structure operable in the manner described to render said power means control effective only sufficiently to controllably oppose the force of said biasing means to retard the rate of movement of said clutch members through their initially engaging range of relation.

11. In automotive power-transmitting systems including a friction clutch having a driving member and a driven member movably engageable for co-rotation in full drive torque transmitting relation, and separable to interrupt transmission of driving torque from an associated prime mover having an actuatable throttle control for varying torque production of said prime mover, said driven member comprising two yieldably interconnected sections adapted for limited relative movement with respect to each other; means biasing said clutch members into engagement; energizable power means operable in opposition to said biasing means for separating said clutch members, and controllable in cooperation with said biasing means to engage said clutch members; means for energizing said power means; control means responsive to initial actuation of said throttle control for rendering said power means control effective, thereby accommodating controlled movement of said clutch members into initial engagement under influence of said biasing means; means controlled by said limited relative movement of the two sections of said driven member when subjected to torque transmission, upon initial engagement thereof with said driving member, to modulate said power means control only sufficiently effective to controllably oppose said biasing means to arrest said clutch members in their initially engaged relation; and a throttle actuator responsive to the clutch-engaging biasing action on said power means while effectively controlling said clutch members in their arrested initially engaged relation for predeterminately increasing the torque production of said prime mover independently of further actuation of said throttle control and substantially proportional to the torque load imposed on said clutch members in their initially engaged relation.

12. In automotive power-transmitting systems including a friction clutch having a driving member and a driven member movably engageable for co-rotation in full drive torque transmitting relation, and separable to interrupt transmission of driving torque from an associated prime mover having an acuatable throttle control for varying torque production of said prime mover, said driven member comprising two yieldably interconnected sections adapted for limited relative movement with respect to each other; means biasing said clutch members into engagement; energizable power means operable in opposition to said biasing means for separating said clutch members, and controllable in cooperation with said biasing means to engage said clutch members; means for energizing said power means; control means responsive to initial actuation of said throttle control for rendering said power means control effective, thereby accommodating controlled movement of said clutch members into initial engagement under influence of said biasing means; means controlled by said limited relative movement of the two sections of said driven member when subjected to torque transmission, upon initial engagement thereof with said driving member, to modulate said power means control only sufficiently effective to controllably oppose said biasing means to arrest said clutch members in their initially engaged relation: a throttle actuator responsive to the clutch-engaging biasing action on said power means while effectively controlling said clutch members in their arrested initially engaged relation for predeterminately increasing the torque production of said prime mover independently of further actuation of said throttle control and substantially proportional to the torque load imposed on said clutch members in their initially engaged relation; and means effective upon said throttle actuator increasing torque production of said prime mover for disabling the arrested clutch control of said power means over the said biasing means to enable said biasing means to move the said clutch members into full drive torque transmitting relation.

13. In automotive power-transmitting systems including a friction clutch having a driving member and a driven member movably engageable for co-rotation in full drive torque transmitting relation, and separable to interrupt transmission of driving torque from an associated prime mover having an actuable throttle control for varying torque production of said prime mover, said driven member comprising two yieldably interconnected sections adapted for limited relative movement with respect to each other; means biasing said clutch members into engagement; energizable power means operable in opposition to said biasing means for separating said clutch members, and controllable in cooperation with said biasing means to engage said clutch members; means for energizing said power means; control means responsive to initial actuation of said throttle control for rendering said power means control effective, thereby accommodating controlled movement of said clutch members into successive initially and fully engaged relations under influence of said biasing means; means controlled by said limited relative movement of the two sections of said driven member when subjected to torque transmission, upon initially engaged relation with said driving member, to modulate said power means control only sufficiently effective to controllably oppose said biasing means to retard the rate of movement of said clutch members through their initially engaging relation only; and a throttle actuator responsive to the clutch-engaging biasing action on said power means while effectively controlling said clutch members through their retarded initially engaging relation for predeterminately increasing the torque production of said prime mover independently of further actuation of said throttle control, and substantially proportional to the torque load imposed on said clutch members through their initially engaging relation.

14. In automotive power-transmitting systems including a friction clutch having a driving member and a driven member movably engageable for co-rotation in full drive torque transmitting relation, and separable to interrupt transmission of driving torque from an associated prime mover having an actuatable throttle control for varying torque production of said prime mover, said driven member comprising two yieldably interconnected sections adapted for limited relative movement with respect to each other; means biasing said clutch members into engagement; energizable power means operable in opposition to said biasing means for separating said clutch members, and controllable in cooperation with said biasing means to engage said clutch members; means for energizing said power means; control means responsive to initial actuation of said throttle control for rendering said power means control effective, thereby accommodating controlled movement of said clutch members into successive initially and fully engaged relations under influence of said biasing means; means controlled by said limited relative movement of the two sections of said driven member when subjected to torque transmission, upon initially engaged relation with said driving member, to modulate said power means control only sufficiently effective to controllably oppose said biasing means to retard the rate of movement of said clutch members through their initially engaging relation only; a throttle actuator responsive to the clutch engaging biasing action on said power means while effectively controlling said clutch members through their retarded initially engaging relation for predeterminately increasing the torque production of said prime mover independently of further actuation of said throttle control, and substantially proportional to the torque load imposed on said clutch members through their initially engaging relation; and means effective upon said throttle actuator increasing torque production of said prime mover for disabling the retarded clutch control of said power means over said biasing means to enable said biasing means to accelerate the rate of engagement of said clutch members under the influence of said biasing means into full torque transmitting relation.

15. In automotive friction clutches having driving mechanism and a two-sectioned driven mechanism, actuatable into partially and fully engaged conditions to transmit drive torque at different efficiencies, and into disengaged condition to interrupt said drive; pre-energized spring means for engaging said clutch mechanisms; an actuator for actuating said clutch mechanisms into fully disengaged condition in opposition to the force of said spring means, and for controlling said clutch mechanisms in cooperation with said spring means into engaged conditions; an output shaft operatively connected to one section of said driven mechanism; a torque transmitting spring-loaded connection operatively interconnecting the two sections of said driven mechanism to accommodate limited relative movement therebetween in opposition to said spring-load when subjected to predetermined torque load; means defining said limited relative movement; control means including a personally-operable member operatable sequentially through first and second movements; torque-responsive means including a movable element operatively connected with the other section of said driven mechanism for actuation thereby to operating position during the aforesaid relative movement thereof whereby said spring-load is increased, in response to first movement of said personally-operable control means to cause the actuator to accommodate actuation of said clutch mechanisms into partially engaged condition by said spring means; and means controlled by the torque-responsive means actuated to operating position in the manner aforestated, to enable the actuator to controllably arrest actuation of said clutch mechanisms by said spring means in their aforementioned partially engaged condition.

16. An automotive friction clutch according to claim 15 wherein the source of drive torque is an internal-combustion engine controlled by a fuel supplying throttle device responsive to the sequential movements of the aforesaid personally-operable means.

17. An automotive friction clutch according to claim 16 wherein the personally-operable means is the engine controlling accelerator treadle mechanism, and first movement thereof being from engine idling position of control in an engine accelerating direction of control.

18. An automotive friction clutch according to claim 17 including structure operable in response to operating the accelerator treadle into engine idling position of control, to enable the actuator to effect full disengagement of said clutch mechanism in opposition to the action of said spring means, whereupon the increased spring-load of the connection is released to automatically restore the relative movement between the two sections of said driven mechanism and normalize the spring-loaded condition of said connection.

19. An automotive friction clutch according to claim 15 wherein said torque-responsive means is adapted for actuation to partial operating position in the manner described, to cause the actuator to controllably retard the rate of engagement of said clutch mechanisms by said spring means through partially engaged condition into fully engaged condition.

20. In combination with a friction clutch comprising driving and driven members; an engine throttle responsive to an operatable accelerator; pre-energized spring means to effect engagement of said clutch members; energizable power means adapted to operatively disengage said clutch members in opposition to the force of said spring-means; energizing means for said power means; first control means responsive to a predetermined position of the accelerator to cause energization of said power means to operatively disengage said clutch members, and to interrupt energization of said power means in response to a predetermined operation of the accelerator, to render said power means effective to control spring-engaging action of said clutch members; second control means having an element operably associated with said clutch driven member for movement thereby to operating position in response to predetermined spring-engaged slipping contact of said clutch members, for controlling said power means to arrest spring-engaging action of said clutch members at said slipping contact condition substantially with the accelerator operated as aforesaid; and throttle actuating means responsive to said arrested power means control of said clutch members influenced by engaging action of said spring means for predeterminately accelerating the engine independently of further operation of the accelerator.

21. In combination with a friction clutch comprising driving and driven members; an engine throttle responsive to an operatable accelerator; pre-energized spring means to effect engagement of said clutch members; energizable power means adapted to operatively disengage said clutch members in opposition to the force of said spring means; energizing means for said power means; first control means responsive to a predetermined position of the accelerator to cause energization of said power means to operatively disengage said clutch members, and to interrupt energization of said power means in response to a predetermined operation of the accelerator, to render said power means effective to control spring engaging action of said clutch members; second control means having an element operably associated with said clutch driven member for movement thereby to operating position in response to predetermined spring-engaged slipping contact of said clutch members, for retarding the rate of spring-engaging action of said clutch members substantially through said slipping contact condition under control of said power means; and throttle actuating means responsive to said retarded power means control of said clutch members influenced by engaging action of said spring means for predeterminately accelerating the engine independently of further operation of the accelerator.

22. In combination with a friction clutch comprising driving and driven members; an engine throttle responsive to an operatable accelerator; pre-energized spring means to effect engagement of said clutch members; energizable power means adapted to operatively disengage said clutch members in opposition to the force of said spring-means; energizing means for said power means; first control means responsive to a predetermined position of the accelerator to cause energization of said power means to operatively disengage said clutch members, and to interrupt energization of said power means in response to a predetermined operation of the accelerator, to render said power means effective to control spring engaging action of said clutch members; second control means having an element operably associated with said clutch driven member for movement thereby to operating position in response to predetermined spring-engaged slipping contact of said clutch members, for controlling said power means to arrest spring-engaging action of said clutch members at said slipping contact condition substantially with the accelerator operated as aforesaid; throttle actuating means responsive to said arrested power means control influenced by engaging action of said spring means for predeterminately accelerating the engine independently of further accelerator operation thereof; and means associated with said last-named means effective upon actuation thereof for disabling said arrested power means control of said clutch members to enable said spring-means to advance said members to fully engaged relation.

23. In combination with a friction clutch comprising driving and driven members; an engine throttle responsive to an operatable accelerator; pre-energized spring means to effect engagement of said clutch members; energizable power means adapted to operatively disengage said clutch members in opposition to the force of said spring means; energizing means for said power means; first control means responsive to a predetermined position of the accelerator to cause energization of said power means to operatively disengage said clutch members, and to interrupt energization of said power means in response to a predetermined operation of the accelerator, to render said power means effective to control spring engaging action of said clutch members; second control means having an element operably associated with said clutch driven member for movement thereby to operating position in response to predetermined spring-engaged slipping contact of said clutch members, for controlling said power means to retard the rate of spring-engaging action of said clutch members through said slipping contact condition substantially with the accelerator operated as aforesaid; throttle actuating means responsive to said retarded power means control influenced by engaging action of said spring means for predeterminately accelerating the engine independently of further accelerator operation thereof; and means associated with said last-named means effective upon actuation thereof for disabling said retarded power means control of said clutch members to enable said spring means to advance said members to fully engaged relation.

24. In combination with a friction clutch comprising driving and driven members; an engine throttle responsive to an operatable accelerator; pre-energized spring means to effect engagement of said clutch members; energizable power means adapted to operatively disengage said clutch members in opposition to the force of said spring means; energizing means for said power means; first control means responsive to a predetermined position of the accelerator to cause energization of said power means to operatively disengage said clutch members, and to interrupt energization of said power means in response to a predetermined operation of the accelerator, to render said power means effective to control spring engaging action of said clutch members; second control means having an element operably associated with said clutch driven member for movement thereby to operating position in response to predetermined spring-engaged slipping contact of said clutch members, for controlling said power means to arrest spring-engaging action of said clutch member at said slipping contact condition substantially with the accelerator operated as aforesaid; throttle actuating means responsive to said arrested power means control influenced by engaging action of said spring means for predeterminately accelerating the engine independently of further accelerator operation thereof; and means enabling resumption of accelerator operation of the throttle to further accelerate the engine when operated beyond said predetermined accelerating position.

25. In combination with a friction clutch comprising driving and driven members; an engine throttle responsive to an operatable accelerator; pre-energized spring means to effect engagement of said clutch members; energizable power means adapted to operatively disengage said clutch members in opposition to the force of said spring means; energizing means for said power means; first control means responsive to a predetermined position of the accelerator to cause energization of said power means to operatively disengage said clutch members, and to interrupt energization of said power means in response to a predetermined operation of the accelerator, to render said power means effective to control spring engaging action of said clutch members; second control means having an element operably associated with said clutch driven member for movement thereby to operating position in response to predetermined spring-engaging slipping contact of said clutch members, for controlling said power means to retard the rate of spring-engaging action of said clutch members through said slipping contact condition substantially with the accelerator operated as aforesaid; throttle actuating means responsive to said retarded power means control influenced by engaging action of said spring means for predeterminately accelerating the engine independently of further accelerator operation thereof; and means enabling resumption of accelerator operation of the throttle to further accelerate the engine when operated beyond said predetermined accelerating position.

26. In combination with a friction clutch comprising driving and driven members; an engine throttle responsive to an operatable accelerator; pre-energized spring means to effect engagement of said clutch members; energizable power means adapted to operatively disengage said clutch members in opposition to the force of said spring means; energizing means for said power means; first control means responsive to a predetermined position of the accelerator to cause energization of said power means to operatively disengage said clutch members, and to interrupt energization of said power means in response to a predetermined operation of the accelerator, to render said power means effective to control spring engaging action of said clutch members; second control means having an element operably associated with said clutch driven member for movement thereby to operating position in response to predetermined spring-engaged slipping contact of said clutch members, for controlling said power means to arrest spring-engaging action of said clutch members at said slipping contact condition substantially with the accelerator operated as aforesaid; throttle actuating means responsive to said arrested power means control of said clutch members influenced by engaging action of said sprnig means for predeterminately accelerating the engine independently of further accelerator operation thereof; means incorporated in said last-named means for overruling said power means arrested control by said second control means of said clutch members to enable said spring means to fully engage said clutch members; and means incorporated in said power means for disabling said throttle actuating means upon full engagement of said clutch members by said spring means, to return operation of said throttle to the accelerator.

27. In combination with a friction clutch comprising driving and driven members; an engine throttle responsive to an operatable accelerator; pre-energized spring means to effect engagement of said clutch members; energizable power means adapted to operatively disengage said clutch members in opposition to the force of said spring means; energizing means for said power means; first control means responsive to a predetermined position of the accelerator to cause energization of said power means to operatively disengage said clutch members, and to interrupt energization of said power means in response to a predetermined operation of the accelerator, to render said power means effective to control spring engaging action of said clutch members; second control means having an element operably associated with said clutch driven member for movement thereby to operating position in response to predetermined spring-engaged slipping contact of said clutch members, for controlling said power means to retard the rate of spring-engaging action of said clutch members through said slipping contact condition substantially with the accelerator operated as aforesaid; throttle actuating means responsive to said retarded power means control of said clutch members influenced by engaging action of said spring means for predeterminately accelerating the engine independently of further accelerator operation thereof; means incorporated in said last-named means for overruling said power means retarded control by said second control means of said clutch members to enable said spring-means to fully engage said clutch members; and means incorporated in said power means for disabling said throttle actuating means upon full engagement of said clutch members by said spring-means, to return operation of said throttle to the accelerator.

28. In an automotive power-transmitting system including a torque producing internal-combustion engine controlled by a throttle responsive to an operatable accelerator mechanism having two extreme positions, and a friction clutch having spring-engageable driving and driven members co-rotatable in drive torque-transmitting relation, and separable to interrupt said drive, said driven member comprising two sections operatively interconnected by yieldable torque-transmitting connections having normally spaced registering abutments defining limited relative angular movement therebetween; a source of energizing pressure fluid; a fluid-pressure energizable servomotor having a movable power element; control valve means having an element movable to two fluid-control positions for causing pressure fluid energization of the servomotor power element to move in one direction in response to operating the accelerator mechanism into one of its extreme positions, and for enabling control of the movement of said power element in an opposite direction in response to predeterminately operating the accelerator mechanism from said one extreme position; means operatively connecting the power element of the servomotor to said clutch to enable the servomotor when energized to separate the said clutch members in opposition to the force of the clutch-spring, and to control said clutch members in cooperation with spring-engaging thereof to successive partially engaging torque transmitting positions, and to a fully engaged position; torque-responsive control means operatively connected to one of the sections of said driven member including an element movably displaceable therewith relatively with respect to the other section, to open and closed fluid-control positions, upon initial spring-engagement of said clutch members through their first-named positions only, said torque-responsive means being normally open to vent pressure fluid produced by restricted exit thereof from the servomotor in cooperatively controlling spring-engagement of said clutch members, and when displaced relatively to interrupt such venting to arrest servomotor control of spring-engagement of said clutch members in their first-named positions with attendant clutch spring-engaging modulation of the last-named pressure fluid; fluid-pressure responsive means adapted to receive the modulated pressure fluid from the servomotor produced by interruption of said normal restricted venting thereof, said last-named means including an energizable power element movable by the modulated pressure fluid from the servomotor for actuating said throttle to accelerate the engine independently of further operation of the accelerator mechanism; and means operable upon such actuation of said throttle by said last-named power element for venting the modulated pressure fluid from the servomotor to enable further control thereby of spring-engagement of said clutch members to fully engaged position.

29. An automotive power-transmitting system according to claim 28 wherein said torque-responsive control means is a valve comprising two concentrically disposed elements operatively connected to and movable relatively with the two sections of said driven member, said elements being provided with registering ports in open position to normally control restricted exit of said second-named pressure fluid from said servomotor, and when moved relatively to interrupt exit of such pressure fluid to modulate the same thus causing said servomotor to arrest spring-engaging of said clutch members substantially in their first-named positions.

30. An automotive power-transmitting system according to claim 28 wherein said torque-responsive control means is a valve comprising two concentrically disposed elements operatively connected to and movable relatively with the two sections of said driven member, said elements being provided with registering ports in open position to normally control restricted exit of said modulated pressure fluid from said servomotor, and when moved relatively to partially interrupt exit of such modulated pressure fluid from said servomotor causing said servomotor to retard the rate of engagement of said clutch members under influence of spring-engaging action through the first-named positions thereof.

31. An automotive power-transmitting system according to claim 30 wherein the two valve elements are rotatable relatively by the two sections of said driven member and also co-rotationally therewith after said relative movement has been effected in the manner described.

32. In an automotive power-transmitting system including a torque producing internal-combustion engine controlled by a throttle responsive to an operatable accelerator, said engine being equipped with mechanism for drivingly impressing said torque on at least two operatively interconnected movable members of a friction clutch to actuate the same in relative and co-rotational relation to transmit said torque at different efficiencies; a source of pressure fluid; a fluid pressure responsive servomotor having a movable power element; control valve means including an element movable to a closed position for disconnecting said source of pressure fluid from said servomotor, in response to a predetermined positioning of the accelerator; means operatively connecting said servomotor power element to said mechanism for controlling actuation of said members to successively increasing torque transmitting efficiency upon disconnection of said servomotor from said source of pressure fluid; torque responsive control means including a movable valve element operatively connected to one of said clutch members for normally venting pressure fluid from said servomotor produced by operation of said servomotor under action of the clutch-engaging spring, and for interrupting said venting upon transmittal of a predetermined torque-load through said clutch members causing said last-named pressure fluid to be modulated; and fluid-pressure-responsive means energized by such fluid under modulated pressure, and effective to actuate said throttle independently of operation of said accelerator, and also for venting said modified pressure fluid from said servomotor to further accommodate spring-engaging movement of said clutch members under control of said servomotor to fully engaged position.

33. An automotive power-transmitting system according to claim 32 wherein said control valve means is adapted to control pressure fluid energization of said servomotor to actuate said clutch to interrupt transmission of torque thereby in response to a different positioning of the accelerator.

34. In an automotive power-transmitting system including a torque producing internal-combustion engine controlled by a throttle responsive to an operatable accelerator having two extreme positions, said engine being equipped with mechanism for drivingly impressing said torque on at least two driven members of a friction clutch to actuate the same relatively and co-rotationally to transmit torque at different efficiencies; an energizable servomotor having a movable power element; means for energizing said servomotor to move said power element; control means including an element movable to two operative positions for controlling energization of said servomotor in response to operating the accelerator into one of its extreme positions, and for interrupting said energization to enable torque impression by said mechanism in response to a predetermined operation of the accelerator from said one extreme position; means operatively connecting said servomotor power element with said mechanism for controlling actuation of said clutch members to successive increasing torque transmitting efficiencies including maximum efficiency upon interrupting energization of said servomotor in the manner described; a control element operatively connected to each of said clutch members for movement therewith, said control elements and associated clutch members being relatively movable prior to actuation of said members into said maximum torque-transmitting efficiency, relative movement of said control elements interrupting clutch member actuation control by said servomotor, thereby preventing maximum torque-transmitting efficiency of said clutch members; a second servomotor having a movable element actuatable in response to such interrupted energization of said first-named servomotor for actuating said throttle independently of further operation of the accelerator to increase torque production of said engine; and means operable upon actuation of said second servomotor to enable further actuation of said clutch members into maximum torque-transmitting efficiency under control of said first-named servomotor.

35. In an automotive power-transmitting system including a torque producing internal-combustion engine controlled by a throttle responsive to an operatable accelerator having two extreme positions, said engine being equipped with mechanism for drivingly impressing said torque on at least two driven members of a friction clutch to actuate the same relatively and co-rotationally to transmit torque at different efficiencies; an energizable servomotor having a movable power element; means for energizing said servomotor to move said power element; control means including an element movable to two operative positions for controlling energization of said servomotor in response to operating the accelerator into one of its extreme positions, and for interrupting said energization to enable torque impression by said mechanism in response to a predetermined operation of the accelerator from said one extreme position; means operatively connecting said servomotor with said mechanism for controlling actuation of said clutch members to successive increasing torque transmitting efficiencies including maximum efficiency upon interrupting energization of said servomotor in the manner described; a control element operatively connected to each of said clutch members for rotational movement therewith, said control elements and associated clutch members being relatively rotatable prior to actuation of said members into said maximum torque-transmitting efficiency, relative movement of said control elements interrupting clutch member actuation control by said servomotor, thereby preventing maximum torque-transmitting efficiency of said clutch members; a second servomotor having a movable element actuatable in response to such interrupted energization of said first-named servomotor for actuating said throttle independently of further operation of the accelerator to increase torque production of said engine; and means operable upon actuation of said second servomotor to enable further actuation of said clutch members into maximum torque-transmitting efficiency under control of said first-named servomotor.

36. In an automotive power-transmitting system including a torque producing internal-combustion engine controlled by a throttle responsive to an operatable accelerator having two extreme positions, said engine being equipped with mechanism for operatively impressing said torque on a driven member of a friction clutch to actuate the same relatively to and co-rotationally with said mechanism to transmit said torque at different efficiencies; means for operating said mechanism; an energizable clutch-actuator; means for energizing said clutch-actuator; control means including an element movable to two operative positions for controlling energization of said clutch-actuator upon operating the accelerator to one of its extreme positions, and for interrupting energization to enable torque impression by said mechanism in response to a predetermined operation of the accelerator from said one extreme position; means operatively connecting said clutch-actuator with said operating means for controlling operation of said mechanism to impress said torque on said driven member to actuate the same to incremental relative torque transmitting efficiencies including maximum co-rotational efficiency upon interrupting energization of said clutch-actuator in the manner described;

valvular means comprising a casing fixedly mounted and having an inner cylindrical bore, an element movable in said bore to control said clutch-actuator when energization thereof is interrupted; and means operatively connecting said element with said driven member for movement thereby when said mechanism initially impresses said torque on said driven member in response to said predetermined operation of the accelerator, to actuate said driven member relatively into reduced torque transmitting efficiency.

37. In an automotive power-transmitting system including a torque producing internal-combustion engine controlled by a throttle responsive to an operatable accelerator having two extreme positions, said engine being equipped with mechanism for operatively impressing said torque on a driven member of a friction clutch to actuate the same relatively to and co-rotationally with said mechanism to transmit said torque at different efficiencies; means for operating said mechanism; an energizable clutch-actuator; means for energizing said clutch-actuator; control means including an element movable to two operative positions for controlling energization of said clutch-actuator upon operating the accelerator to one of its extreme positions, and for interrupting energization to enable torque impression by said mechanism in response to a predetermined operation of the accelerator from said one extreme position; means operatively connecting said clutch-actuator with said operating means for controlling operation of said mechanism to impress said torque on said driven member to actuate the same to incremental relative torque transmitting efficiencies including maximum co-rotational efficiency upon interrupting energization of said clutch-actuator in the manner described; valvular means comprising a casing fixedly mounted and having an inner cylindrical bore, an element movable in said bore to control said clutch-actuator when energization thereof is interrupted; and means operatively connecting said element with said driven member for movement thereby when said mechanism initially impresses said torque on said driven member in response to said predetermined operation of the accelerator, to actuate said driven member relatively through reduced torque transmitting efficiencies.

38. In an automotive power-transmitting system including a torque producing internal-combustion engine controlled by a throttle responsive to an operatable accelerator having two extreme positions, said engine being equipped with mechanism for operatively impressing said torque on a driven member of a friction clutch to actuate the same relatively to and co-rotationally with said mechanism to transmit said torque at different efficiencies; means for operating said mechanism; an energizable clutch-actuator; means for energizing said clutch-actuator; control means including an element movable to two operative positions for controlling energization of said clutch-actuator upon operating the accelerator to one of its extreme positions, and for interrupting energization to enable torque impression by said mechanism in response to a predetermined operation of the accelerator from said one extreme position; means operatively connecting said clutch-actuator with said operating means for controlling operation of said mechanism to impress said torque on said driven member to incremental relative torque transmittting efficiencies including maximum co-rotational efficiency upon interrupting energization of said clutch-actuator in the manner described; valvular means comprising a casing fixedly mounted and having an inner cylindrical bore, an element rotatable in said bore to control said clutch-actuator when energization thereof is interrupted; and means operatively connecting said element with said driven member for rotation thereby when said mechanism initially impresses said torque on said driven member in response to said predetermined operation of the accelerator, to actuate said driven member relatively into reduced torque transmitting efficiency.

39. In an automotive power-transmitting system including a torque producing internal-combustion engine controlled by a throttle responsive to an operatable accelerator having two extreme positions, said engine being equipped with mechanism for operatively impressing said torque on a driven member of a friction clutch to actuate the same relatively to and co-rotationally with said mechanism to transmit said torque at different efficiencies; means for operating said mechanism; an energizable clutch-actuator; means for energizing said clutch-actuator; control means including an element movable to two operative positions for controlling energization of said clutch-actuator upon operating the accelerator to one of its extreme positions, and for interrupting energization to enable torque impression by said mechanism in response to a predetermined operation of the accelerator from said one extreme position; means operatively connecting said clutch-actuator with said operating means for controlling operation of said mechanism to impress said torque on said driven member to incremental relative torque transmitting efficiencies including maximum co-rotational efficiency upon interrupting energization of said clutch-actuator in the manner described; valvular means comprising a casing fixedly mounted and having an inner cylindrical bore, an element rotatable in said bore to control said clutch-actuator when energization thereof is interrupted; and means operatively connecting said element with said driven member for rotation thereby when said mechanism initially impresses said torque on said driven member in response to said predetermined operation of the accelerator, to actuate said driven member relatively through reduced torque transmitting efficiencies.

40. In an automotive power-transmitting system including a torque producing internal-combustion engine controlled by a throttle responsive to an operatable accelerator having two extreme positions, said engine being equipped with mechanism for operatively impressing said torque on a driven member of a friction clutch to actuate the same relatively to and co-rotationally with said mechanism to transmit said torque at different efficiencies; means for operating said mechanism; an energizable clutch-actuator; means for energizing said clutch-actuator; control means including an element movable to two operative positions for controlling energization of said clutch-actuator upon operating the accelerator to one of its extreme positions, and for interrupting energization to enable torque impression by said mechanism in response to a predetermined operation of the accelerator from said one extreme position; means operatively connecting said clutch-actuator with said operating means for controlling operation of said mechanism to impress said torque on said driven member to incremental relative torque transmitting efficiencies including maximum co-rotational efficiency upon interrupting energization of said clutch-actuator in the manner described; valvular means comprising a casing fixedly mounted and having an inner cylindrical bore, an element movable in said bore to control said clutch-actuator when energization thereof is interrupted; and means operatively connecting said element with said driven member for movement thereby when said mechanism initially impresses said torque on said driven member in response to said predetermined operation of the accelerator, to actuate said driven member relatively into reduced torque transmitting efficiency; and a throttle actuator responsive to clutch-actuator control of said operating means to establish said reduced torque-transmitting efficiency of said driven member, to increase torque production of the engine independently of further operation of the accelerator.

41. In an automotive power-transmitting system including a torque producing internal-combustion engine controlled by a throttle responsive to an operatable accelerator having two extreme positions, said engine being equipped with mechanism for operatively impressing said torque on a driven member of a friction clutch to actuate the same relatively to and co-rotationally with said mechanism to transmit said torque at different efficiencies; means for operating said mechanism; an energizable clutch-actuator; means for energizing said clutch-actuator; control means including an element movable to two operative positions for controlling energization of said clutch-actuator upon operating the accelerator to one of its extreme positions, and for interrupting energization to enable torque impression by said mechanism in response to a predetermined operation of the accelerator from said one extreme position; means operatively connecting said clutch-actuator with said operating means for controlling operation of said mechanism to impress said torque on said driven member to incremental relative torque transmitting efficiencies including maximum co-rotational efficiency upon interrupting energization of said clutch-actuator in the manner described; valvular means comprising a casing fixedly mounted and having an inner cylindrical bore, an element rotatable in said bore to control said clutch-actuator when energization thereof is interrupted; and means operatively connecting said element with said driven member for rotation thereby when said mechanism initially impresses said torque on said driven member in response to said predetermined operation of the accelerator, to actuate said driven member relatively into reduced torque transmitting efficiencies; and a throttle actuator responsive to clutch-actuator control of said operating means to establish said reduced torque-transmitting efficiencies of said driven member, to increase torque production of the engine independently of further operation of the accelerator.

42. In combination with a friction clutch comprising driving and driven members: an engine throttle responsive to an operatable accelerator; pre-energized spring means to effect engagement of said clutch members; energizable power means adapted to operatively disengage said clutch members in opposition to the force of said spring means; energizing means for said power means; first control means responsive to a predetermined position of the accelerator to cause energization of said power means to operatively disengage said clutch members, and to interrupt energization of said power means in response to a predetermined operation of the accelerator, to render said power means effective to control spring-engaging action of said clutch members; second control means having an element operably associated with said clutch driven member for movement thereby to operating position in response to predetermined spring-engaged slipping contact of said clutch members, for controlling said power means to arrest spring-engaging action of said clutch members at said slipping contact condition substantially with the accelerator operated as aforesaid; and third control means responsive to operating the accelerator beyond the predetermined operation aforesaid in an engine accelerating direction for overruling the second control means whereby the engaging action of said spring means is rendered effective to fully engage said clutch members.

43. In an automotive power-transmitting system including a torque producing internal-combustion engine controlled by a throttle responsive to an operatable accelerator mechanism having two extreme positions, and a spring-engageable friction clutch drivingly connected to the engine for transmitting the torque to an output shaft: a source of pressure fluid different from atmosphere; a fluid-pressure-responsive servomotor having a reciprocable power element; means operatively connecting the power element with the clutch; control valve means having a movable element operable for placing the servomotor in communication with said source to cause energized movement of the power element in one direction to operatively disengage the clutch in opposition to the spring-engaging action, in response to operating the accelerator mechanism to one of its extreme positions, and for interrupting such fluid-pressure communication whereby movement of the power element is controllable in the opposite direction to cooperatively enable spring-engagement of the clutch upon predeterminately operating the accelerator mechanism from said one extreme position; torque-responsive valve means operatively incorporated between the clutch and output shaft and normally accommodating operation of the servomotor in said one direction to disengage the clutch, and being further adapted to control movement of the power element in the opposite direction in response to initial spring-engagement of the clutch to thereby arrest movement of the power element and establish the clutch in partially engaged condition; and additional valve means having a movable element responsive to further operation of the accelerator mechanism for overruling the last-named valve means to control arrested movement of the power element aforesaid, to release the power element for movement under influence of the clutch spring-engaging action to fully engage the clutch.

44. In an automotive power-transmitting system including a torque producing internal-combustion engine controlled by a throttle responsive to an operatable accelerator mechanism having two extreme positions, and a spring-engageable friction clutch drivingly connected to the engine for transmitting the torque to an output shaft: a source of pressure fluid different from atmosphere including conduit means for conveying the same; a fluid-pressure-responsive servomotor having a reciprocable power element; means operatively connecting the power element with the clutch; control valve means operable for placing said servomotor in communication via said conduit means with said source to cause operative energization of the power element to move in one direction to operatively disengage the clutch in opposition to the spring-engaging action in response to operating the accelerator mechanism to one of its extreme position, and for interrupting such operative energization whereby movement of the power element in the opposite direction is controllable to cooperatively enable spring-engagement of the clutch upon predeterminately operating the accelerator mechanism from said one extreme position; other conduit means having two branches leading from the servomotor; torque-responsive valve means connected to one branch of said other conduit means and operatively incorporated between the clutch and output shaft, normally accommodating operative energization aforesaid of said servomotor to effect clutch disengagement, and being further adapted to modulate such operative energized condition of said servomotor in response to initial spring-engagement of the clutch to arrest the power element movement in its opposite direction thereby establishing the clutch in partially engaged condition; fluid-pressure-responsive means connected to the other branch of said other conduit means and having a power element movable in response to the modulated energized condition of said servomotor for actuating said throttle to accelerate the engine independently of further operation of the accelerator mechanism; and means effective upon such actuation of said throttle for controllably de-energizing said servomotor to accommodate further movement of the first-named power element under influence of the clutch spring-engaging action to fully engage the clutch and restore actuation of the throttle to the accelerator mechanism.

45. An automotive power-transmitting system according to claim 36 including means controllable responsive to further operation of said accelerator in an engine accelerating direction, for overruling control of said clutch-actuator by said valvular means in the manner described, whereby maximum torque transmitting efficiency of said driven member is rendered effective following effectiveness of such reduced torque transmitting efficiency thereof.

46. An automotive power-transmitting system according to claim 37 including means controllable responsive to further operation of said accelerator in an engine accelerating direction, for cooperating with said valvular means control to control said clutch-actuator in the manner described, whereby maximum torque transmitting efficiently of said driven member is rendered effective.

47. An automotive power-transmitting system according to claim 38 including means controllable responsive to further operation of said accelerator in an engine accelerating direction, for overruling control of said clutch-actuator by said valvular means in the manner described, whereby maximum torque transmitting efficiency of said driven member is rendered effective following effectiveness of such reduced torque transmitting efficiency thereof.

48. An automotive power-transmitting system according to claim 39 including means controllable responsive to further operation of said accelerator in an engine accelerating direction, for cooperating with said valvular means control to control said clutch-actuator in the manner described, whereby maximum torque transmitting efficiency of said driven member is rendered effective.

49. In an automotive power-transmitting system including a torque producing internal-combustion engine controlled by a throttle responsive to an operatable accelerator mechanism having two extreme positions, and a spring-engageable friction cluch drivingly connected to the engine for transmitting the torque to an output shaft: a source of pressure fluid different from atmosphere including conduit means for conveying the same; a fluid-pressure-responsive servomotor having a reciprocable power element; means operatively connecting the power element with the clutch; control valve means operable for placing said servomotor in communication via said conduit means with said source to cause operative energization of the power element to move in one direction to operatively disengage the cluch in opposition to the spring-engaging action in response to operating the accelerator mechanism to one of its extreme positions, and for interrupting such operative energization whereby movement of the power element in the opposite direction is controllable to cooperatively enable spring-engagement of the clutch upon predeterminately operating the accelerator mechanism from said one extreme position; other conduit means having two branches leading from the servomotor; torque-responsive valve means connected to one branch of said other conduit means and operatively incorporated between the clutch and output shaft, normally accommodating operative energization aforesaid of said servomotor to effect clutch disengagement, and being further adapted to modulate such operative energized condition of said servomotor in response to initial spring-engagement of the clutch to arrest the power element movement in its opposite direction thereby establishing the clutch in partially engaged condition; and additional valve means connected to the other branch of said other conduit means and having an element movable in response to further operation of the accelerator mechanism in an engine accelerating direction for overruling aforesaid control by said torque-responsive valve means and for controllably de-energizing said servomotor to accommodate further movement of the servomotor power element under influence of the clutch spring-engaging action to fully engage the clutch.

50. In an automotive power-transmitting system including a torque producing internal-combustion engine controlled by a throttle responsive to an operatable accelerator mechanism having two extreme positions, and a spring-engageable friction clutch drivingly connected to the engine for transmitting the torque to an output shaft: a source of pressure fluid different from atmosphere including conduit means for conveying the same; a fluid-pressure-responsive servomotor comprising two fluid chambers isolated by an alternately movable power element; means operatively connecting the power element with the clutch; control valve means operable for placing said servomotor in communication via said conduit means with said source to cause energized movement of the power element in one direction to operatively disengage the clutch in opposition to the spring-engaging action in response to operating the accelerator mechanism to one of its extreme positions, and for interrupting such fluid-pressure communication whereby the power element is controllable in the opposite direction to cooperatively enable spring-engagement of the clutch upon predeterminately operating the accelerator mechanism from said one extreme position; other conduit means having two branches leading from the servomotor; torque-responsive valve means connected to one branch of said other conduit means and operatively incorporated between the clutch and the output shaft, normally accommodating the other servomotor chamber to be charged with fluid at atmospheric pressure during cluch disengagement, and being further adapted to modulate such atmospheric condition in response to initial spring-engagement of the clutch, to arrest the power element movement in its opposite direction thereby establishing the clutch in partially engaged condition; and additional valve means connected to the other branch of said other conduit means and having an element movable in response to further operation of the accelerator mechanism in an engine accelerating direction for overruling aforesaid control by said torque-responsive valve means and for controllably restoring atmospheric condition in said other servomotor chamber to accommodate further movement of the servomotor power element under influence of the clutch spring-engaging action to fully engage the clutch.

References Cited in the file of this patent

UNITED STATES PATENTS

| | | |
|---|---|---|
| 1,137,507 | McKeever | Apr. 27, 1915 |
| 1,470,773 | Small | Oct. 16, 1923 |
| 1,702,721 | Charles | Feb. 19, 1929 |
| 1,706,739 | Moran | Mar. 26, 1929 |
| 1,979,488 | Perez | Nov. 6, 1934 |
| 2,067,848 | Hnizdo | Jan. 12, 1937 |
| 2,087,643 | Gillett | July 20, 1937 |
| 2,102,271 | Irving | Dec. 14, 1937 |
| 2,109,420 | Guernsey | Feb. 22, 1938 |
| 2,134,520 | Kliesrath | Oct. 25, 1938 |
| 2,187,824 | Britton | Jan. 23, 1940 |
| 2,197,469 | Hawks | Apr. 16, 1940 |
| 2,208,865 | Gette | July 23, 1940 |
| 2,217,940 | Bragg | Oct. 15, 1940 |
| 2,225,315 | McCollum | Dec. 17, 1940 |
| 2,240,712 | Newton | May 6, 1941 |
| 2,252,136 | Price | Aug. 12, 1941 |
| 2,296,282 | Hruska | Sept. 22, 1942 |
| 2,365,470 | Ingres | Dec. 19, 1944 |
| 2,531,710 | Thomas | Nov. 28, 1950 |